United States Patent
Pantus et al.

(10) Patent No.: US 10,506,552 B2
(45) Date of Patent: Dec. 10, 2019

(54) CORE NETWORK NODE, RADIO NETWORK NODE, WIRELESS DEVICE AND METHODS PERFORMED THEREIN

(71) Applicant: Telefonaktiebolaget LM Ericsson (publ), Stockholm (SE)

(72) Inventors: Alexander Pantus, Solna (SE); Angelo Centonza, Stockholm (SE); Gunnar Mildh, Sollentuna (SE); Jari Vikberg, Järna (SE); Oscar Zee, Stockholm (SE); Paul Schliwa-Bertling, Ljungsbro (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/074,426

(22) PCT Filed: Feb. 12, 2016

(86) PCT No.: PCT/SE2016/050104
§ 371 (c)(1),
(2) Date: Jul. 31, 2018

(87) PCT Pub. No.: WO2017/135857
PCT Pub. Date: Aug. 10, 2017

(65) Prior Publication Data
US 2019/0037531 A1    Jan. 31, 2019

Related U.S. Application Data

(60) Provisional application No. 62/291,577, filed on Feb. 5, 2016.

(51) Int. Cl.
*H04W 68/02* (2009.01)
*H04W 48/16* (2009.01)
(Continued)

(52) U.S. Cl.
CPC .......... *H04W 68/02* (2013.01); *H04W 48/16* (2013.01); *H04W 68/00* (2013.01); *H04W 68/005* (2013.01); *H04W 60/04* (2013.01)

(58) Field of Classification Search
CPC ... H04W 68/02; H04W 68/00; H04W 68/005; H04W 60/04; H04W 48/16
(Continued)

(56) References Cited

U.S. PATENT DOCUMENTS

2002/0019241 A1 * 2/2002 Vialen ................ H04W 68/00
455/458
2007/0259675 A1 * 11/2007 Worrall ............... H04W 68/00
455/458

(Continued)

OTHER PUBLICATIONS

3GPP TR 22.7xx V0.2.0 (Nov. 2015), "Feasibility Study on New Services and Markets Technology Enablers—Network Operation," 3rd Generation Partnership Project; Technical Specification Group Services and System Aspects; Stage 1, Release 14, Nov. 2015, 20 pages.

(Continued)

*Primary Examiner* — William Nealon
(74) *Attorney, Agent, or Firm* — Patent Portfolio Builders, PLLC

(57) ABSTRACT

A method performed by a core network node for handling communication for a wireless device in a communication network, wherein the communication network comprises partitioned sets of functionalities. A first set of functionalities belongs to a first network slice supporting the wireless device, and a second set of functionalities belongs to a second network slice supporting the wireless device, and which first and second sets of functionalities are separated from one another and other sets of functionalities. The core network node obtains a common identity for defining paging occasion for the wireless device for paging from the first (Continued)

network slice and the second network slice. The core network node receives a paging request for the wireless device from the first network slice when the wireless device is in idle mode, and the core network node initiates a paging procedure of the wireless device by using the obtained common identity.

38 Claims, 15 Drawing Sheets

(51) Int. Cl.
*H04W 60/04* (2009.01)
*H04W 68/00* (2009.01)

(58) Field of Classification Search
USPC .......................................................... 455/458
See application file for complete search history.

(56) References Cited

U.S. PATENT DOCUMENTS

| | | | | |
|---|---|---|---|---|
| 2009/0061851 | A1* | 3/2009 | Kitazoe | H04W 68/00 455/426.1 |
| 2013/0303203 | A1* | 11/2013 | Wang | H04W 68/00 455/458 |
| 2014/0086177 | A1* | 3/2014 | Adjakple | H04W 12/08 370/329 |

OTHER PUBLICATIONS

3GPP TS 23.401 V13.4.0 (Sep. 2015), "General Packet Radio Service (GPRS) enhancements for Evolved Universal Terrestrial Radio Access Network (E-UTRAN) access," 3rd Generation Partnership Project; Technical Specification Group Services and System Aspects; (Release 13), Sep. 2015; 334 pages.
3GPP TS 36.300 V13.1.0 (Sep. 2015), "Evolved Universal Terrestrial Radio Access (E-UTRA) and Evolved Universal Terrestrial Radio Access Network (E-UTRAN); Overall description; Stage 2," 3rd Generation Partnership Project; Technical Specification Group Radio Access Network; (Release 13), Sep. 2015, 254 pages.
Deutsche Telekom AG., et al., "Requirements for Next Generation Access Technologies," RPA160003, 3GPP TSG RAN ad-hoc, Jan. 28-29, 2016—Barcelona, Spain, 6 pages.
International Search Report and Written Opinion for Application No. PCT/SE2016/050104, dated Oct. 12, 2016, 8 pages.
NGMN Alliance, NGMN 5G White Paper, V1.0, 3rd generation Partnership project, Mobile Competence Centre, Feb. 17, 2015, 125 pages.
ZTE Corporation et al., "Update the Network Slicing Use Case in SMARTER," 3GPP TSG-SA WG1 Meeting #71, S1-152395 revision of S1-152074, Aug. 17-21, 2015, Belgrade, Serbia, 3 pages.
International Preliminary Report on Patentability for Application No. PCT/SE2016/050104, dated Aug. 16, 2018, 7 pages.

* cited by examiner

CORE NETWORK NODE, RADIO NETWORK NODE, WIRELESS DEVICE AND METHODS PERFORMED THEREIN

CROSS-REFERENCE TO RELATED APPLICATIONS

This application is a National stage of International Application No. PCT/SE2016/050104, filed Feb. 12, 2016, which claims priority to U.S. Application No. 62/291,577, filed Feb. 5, 2016, which are all hereby incorporated by reference.

TECHNICAL FIELD

Embodiments herein relate to a core network node, a radio network node, a wireless device and methods performed therein for communication. Furthermore, a computer program and a computer readable storage medium are also provided herein. In particular, embodiments herein relate to enabling communication for a wireless device in a communication network.

BACKGROUND

In a typical communication network, wireless devices, also known as wireless communication devices, mobile stations, stations (STA) and/or user equipments (UE), communicate via a Radio Access Network (RAN) to one or more core networks (CN). The RAN covers a geographical area which is divided into service areas or cell areas, with each service area or cell area being served by a radio network node such as a radio access node e.g., a Wi-Fi access point or a radio base station (RBS), which in some networks may also be denoted, for example, a "NodeB" or "eNodeB" (eNB). A service area or cell area is a geographical area where radio coverage is provided by the radio network node. The radio network node communicates over an air interface operating on radio frequencies with the wireless device within range of the radio network node.

A Universal Mobile Telecommunications System (UMTS) is a third generation (3G) telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the $3^{rd}$ Generation Partnership Project (3GPP) and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface. EPS is the Evolved 3GPP Packet Switched Domain. FIG. 1 is an overview of the EPC architecture. This architecture is defined in 3GPP TS 23.401 v.13.4.0 wherein a definition of a Packet Data Network Gateway (P-GW), a Serving Gateway (S-GW), a Policy and Charging Rules Function (PCRF), a Mobility Management Entity (MME) and a wireless or mobile device (UE) is found. The LTE radio access, E-UTRAN, comprises one or more eNBs. FIG. 2 shows the overall E-UTRAN architecture and is further defined in for example 3GPP TS 36.300 v.13.1.0. The E-UTRAN comprises eNBs, providing a user plane comprising the protocol layers Packet Data Convergence Protocol (PDCP)/Radio Link Control (RLC)/Medium Access Control (MAC)/Physical layer (PHY), and a control plane comprising Radio Resource Control (RRC) protocol in addition to the user plane protocols towards the wireless device. The radio network nodes are interconnected with each other by means of the X2 interface. The radio network nodes are also connected by means of the S1 interface to the EPC, more specifically to core network nodes such as the MME by means of an S1-MME interface and to the S-GW by means of an S1-U interface.

The S1-MME interface is used for control plane between eNodeB/E-UTRAN and MME. The main protocols used in this interface are S1 Application Protocol (S1AP) and Stream Control Transmission Protocol (SCTP). S1AP is the application layer protocol between the radio network node and the MME and SCTP for example guarantees delivery of signaling messages between MME and the radio network node. The transport network layer is based on Internet Protocol (IP).

A subset of the S1 interface provided functions are:
S1-interface management functions such as S1 setup, error indication, reset and the radio network node and MME configuration update.
UE Context Management functionality such as Initial Context Setup Function and UE Context Modification Function.
E-UTRAN Radio Access Bearer (E-RAB) Service Management functions e.g. Setup, Modify, Release.
Mobility Functions for wireless devices in EPS Connection Management (ECM)-CONNECTED, e.g. Intra-LTE Handover and inter-3GPP-Radio Access Technology (RAT) Handover.
S1 Paging function.
Non Access Stratum (NAS) Signaling Transport function.
Establishment of the S1-MME interface on S1AP protocol level is shown in FIG. 3 as the S1 setup procedure. The purpose of the S1 Setup procedure is to exchange application level data needed for the radio network node and the MME to correctly interoperate on the S1 interface. The radio network node may initiate the procedure by sending an S1 SETUP REQUEST message to the MME once it has gained IP connectivity and it has been configured with at least one Tracking Area Indicator (TAI). The TAI(s) are used by the radio network node to locate IP-addresses of the different MMEs, possibly in different MME pools. The radio network node includes its global radio network node identity and other information in the S1 SETUP REQUEST message. The MME responds with an S1 SETUP RESPONSE message. This S1 SETUP RESPONSE message includes for example the Globally Unique MME identifier(s) (GUMMEI) of the MME.

An Initial Context Setup process is shown in FIG. 4. An INITIAL CONTEXT SETUP REQUEST message is sent by the MME to request the setup of a UE context or context of a wireless device. This INITIAL CONTEXT SETUP REQUEST message comprises information related to both the UE context and different E-RABs to be established. For each E-RAB the MME includes E-RAB Quality of Service (QoS) parameters such as QoS Class Identifier (QCI) and Allocation and Retention Priority (ARP). The QCI is a scalar that is used as a reference to radio access node-specific parameters that control bearer level packet forwarding treatment, e.g. scheduling weights, admission thresholds, queue management thresholds, link layer protocol configuration, etc., and that have been pre-configured by the operator owning the radio network node. An INITIAL CONTEXT SETUP RESPONSE message is sent by eNB to the MME confirming the setup. Current assumption is that the RAN-CN split is similar for 5G as for 4G, implying an (evolved) S1 interface.

Radio Resource Control (RRC) States

RRC, which is terminated in the radio network node on the network side from the wireless device, performs functions like:

Broadcast
Paging
RRC connection management
Resource Block (RB) control
Mobility functions
Wireless device measurement reporting and control
The RRC states are:
RRC_IDLE
RRC_CONNECTED A wireless device is in the RRC_CONNECTED state when an RRC connection has been established between the wireless device and the radio network node. If this is not the case, i.e. no RRC connection is established, the wireless device is in the RRC_IDLE state.

EPS Mobility Management (EMM) and EPS Connection Management (ECM) States

The EPS Mobility Management (EMM) states describe the Mobility Management states that result from the mobility management procedures e.g. Attach and Tracking Area Update procedures.

Two major EMM states are:
EMM-DEREGISTERED
EMM-REGISTERED.

The EPS Connection Management (ECM) states describe the signaling connectivity between the wireless device and the EPC, which includes both RRC connection between the wireless device and radio network node and S1 connection, i.e. S1AP association, between radio network node and MME.

Two major ECM states are:
ECM-IDLE.
ECM-CONNECTED.

In general, the ECM and EMM states are independent of each other. Transition from EMM-REGISTERED to EMM-DEREGISTERED can occur regardless of the ECM state, e.g. by explicit detach signaling in ECM-CONNECTED or by implicit detach locally in the MME during ECM-IDLE. However there are some relations, e.g. to transition from EMM-DEREGISTERED to EMM-REGISTERED the wireless device has to be in the ECM-CONNECTED state.

The wireless communication industry is at the verge of a unique business crossroads. The growing gap between capacity and demand is an urgent call for new approaches and alternative network technologies to enable mobile operators to achieve more with less. Today, mobile broadband data is growing at an annual rate of 40-50 percent per year in the U.S. and other regions globally. Mobile service providers address these rapidly expanding traffic volumes through deployment of additional network functions, which will be a significant capital expenditure (CAPEX) challenge. The nature of the mobile broadband data traffic is also evolving with new services including new video applications, connected cars and the Internet of Things (IoT). This rapid capacity growth and increasing traffic diversity in LTE networks stresses the assumptions of existing network architectures and operational paradigms.

Network Functions Virtualization (NFV) provides a new path that can increase the flexibility required by mobile service providers and network operators to adapt and accommodate this dynamic market environment. NFV is a new operational approach applying well-known virtualization technologies to create a physical Commercial Off-the-Shelf (COTS) distributed platform for the delivery of end-to-end services in the context of the demanding environment of telecom network infrastructure and applications.

Because EPC is critical to the realization and management of all LTE traffic, it is important to consider use cases related to virtualization of the EPC elements. Each individual EPC element also has specific considerations that determine whether to deploy with NFV. Virtualized EPC (vEPC) is a good example: Multiple virtualized network functions (VNF) can be deployed and managed on a Network Functions Virtualization Infrastructure (NFVI) but must cater to performance scalability in both signaling/control plane and user plane, each potentially demanding different levels of NFVI resources.

vEPC elements can benefit from more agile deployment and scalability. However, virtual resource monitoring and orchestration, along with service awareness, are essential for implementing elasticity effectively. Due to the nature of telecom networks, service Level Agreements (SLA) will be a key issue for a virtualized mobile core network. Because virtualization usually leads to a performance trade-off, equipment vendors must optimize data-plane processing to satisfy carrier-grade bandwidth and latency requirements and sufficient control-plane performance for SLAs needed to ensure availability of regulatory services, such as emergency calls.

VNF is a virtualized network function which serves as a VNF Software for providing virtual network capabilities. A VNF could be decomposed and instantiated in roles such as Virtualized MME (vMME), Virtualized PCRF (vPCRF), Virtualized SGW (vSGW) or Virtualized PDN-GW (vPDN-GW).

NFV is seen as an enabler for network slicing that is described herein.

When looking at the wide range of applications and use cases that are addressed with a 5G network, it is quite obvious these cannot effectively be addressed with a traditional approach of having a purpose built network for each application. This will lead to high cost for networks and devices as well as inefficient use of valuable frequency resources. An operator may have one physical network infrastructure and one pool of frequency bands, which may support many separate virtualized networks, also called network slices. Each network slice may have unique characteristics for meeting the specific requirements of the use case/s it serves.

A key function of 5G Core network is to allow for flexibility in network service creation, making use of different network functions suitable for the offered service in a specific network slice, e.g. Evolved Mobile Broadband (MBB), Massive Machine Type Communication (MTC), Critical MTC, Enterprise, etc.

In addition to Service optimized networks there are more drivers for Network slicing, such as;

- Business expansion by low initial investment: Given the physical infrastructure it is much easier to instantiate another Packet Core instance for the business expansion than to set up a new parallel infrastructure or even integrated nodes
- Low risk by no/limited impact on legacy: As the new instance is logically separated from the other network slices, the network slices can also provide resource isolation between each other. Thus introduction of a new isolated network slice will not impact the existing operator services and therefore only provide low risk
- Short Time To Market (TTM): The operators are concerned about the time it takes to set up the network for a new service. Slicing of the network for different services/operator use cases provides a separation of concern that can result in a faster setup of a network slice for a certain service as it is separately managed and with limited impact on other network slices
- Optimized use of resources: Today the network is supporting many different services but with new use cases and more diverging requirements there is a need for optimizing the network for the specific type use case. Network slicing allows to match services to optimized network instances, and it also allows for a more optimized use of those specific resources
- Allows for individual network statistics: With service specific network slices and possibly even on the level of individual enterprises, there is a possibility of collecting network statistics specific for a limited and well defined group of users of the network slice. This is not the key driver for slicing but rather a benefit that may be a useful tool Slicing can also be used to isolate different services in an operator's network. Future networks are expected to support new use cases going beyond the basic support for voice services and mobile broadband currently supported by existing cellular network, e.g. 2G/3G/4G. Some example use cases include:

Evolution of MBB
  Evolved communication services
  Cloud services
  Extended mobility and coverage
Mission critical Machine Type Communication
  Intelligent traffic systems
  Smart grid
  Industrial applications
Massive Machine Type Communication
  Sensors/actuators
  Capillary networks
Media
  Efficient on-demand media delivery
  Media awareness
  Efficient support for broadcast services These use cases are expected to have different performance requirements, e.g. bit-rates, latencies, as well as other network requirements, e.g. mobility, availability, security etc., affecting the network architecture and protocols.

Supporting these use cases could also mean that new players and business relations are needed compared to existing cellular networks. For instance it is expected that future networks should address the needs of Enterprise services
Government services, e.g. national and/or public safety
Verticals industries, e.g. automation, transportation
Residential users These different users and services are also expected to put new requirements on the network. FIG. 5 shows an example of a network slicing for a case when there exists different network slices in the core network for MBB, Massive MTC and Critical MTC. In other words, the network slices may comprise separate core network instances supporting the different network slices.

Network slicing introduces the possibility that the network slices are used for different services and use cases and there is a need to enable usage of this mechanism for wireless devices using more than one network slice in the communication network to improve the performance of the communication network.

SUMMARY

An object of embodiments herein is to provide a mechanism for handling communication for a wireless device in a communication network in an efficient manner.

According to an aspect the object is achieved by a method performed by a core network node for handling communication for a wireless device in a communication network. The communication network comprises partitioned sets of functionalities wherein a first set of functionalities belongs to a first network slice supporting the wireless device, and a second set of functionalities belongs to a second network slice supporting the wireless device. The first and second sets of functionalities are separated from one another and other sets of functionalities out of a total set of functionalities in the communication network. The core network node obtains a common identity for defining paging occasion for the wireless device for paging from the first network slice and the second network slice. The core network node further receives a paging request for the wireless device from the first network slice when the wireless device is in idle mode; and initiates a paging procedure of the wireless device by using the obtained common identity to define when to page the wireless device.

According to another aspect the object is achieved by a method performed by a wireless device for handling communication for the wireless device in a communication network. The communication network comprises partitioned sets of functionalities wherein a first network slice supporting the wireless device, and a second set of functionalities belongs to a second network slice supporting the wireless device. The first and second sets of functionalities are separated from one another and other sets of functionalities out of a total set of functionalities in the communication network. The wireless device obtains a common identity for defining paging occasion for the wireless device for paging from the first network slice and the second network slice. The wireless device further uses the obtained common identity for determining when to listen for a paging message from the first network slice.

According to still another aspect the object is achieved by a method performed by a radio network node for handling communication for a wireless device in a communication network. The communication network comprises partitioned sets of functionalities wherein a first set of functionalities belongs to a first network slice supporting the wireless device, and a second set of functionalities belongs to a second network slice supporting the wireless device. The first and second sets of functionalities are separated from one another and other sets of functionalities out of a total set of functionalities in the communication network. The radio network node generates a common identity for defining paging occasion for the wireless device for paging from the first network slice and the second network slice. The radio network node further provides the generated common identity to the wireless device and/or a core network node serving the first network slice during attachment of the wireless device to the core network node.

According to yet still another aspect the object is achieved by providing a core network node for handling communication for a wireless device in a communication network. The communication network comprises partitioned sets of functionalities wherein a first set of functionalities belongs to a first network slice supporting the wireless device, and a second set of functionalities belongs to a second network slice supporting the wireless device, and which first and second sets of functionalities are separated from one another and other sets of functionalities out of a total set of functionalities in the communication network. The core network node is configured to obtain a common identity for defining paging occasion for the wireless device for paging from the first network slice and the second network slice. The core network node is configured to receive a paging request for the wireless device from the first network slice when the wireless device is in idle mode. The core network node is configured to initiate a paging procedure of the wireless device by using the obtained common identity to define when to page the wireless device.

According to yet still another aspect the object is achieved by providing a wireless device for handling communication for the wireless device in a communication network. The communication network comprises partitioned sets of functionalities wherein a first network slice supporting the wireless device, and a second set of functionalities belongs to a second network slice supporting the wireless device, and which first and second sets of functionalities are separated from one another and other sets of functionalities out of a total set of functionalities in the communication network. The wireless device is configured to obtain a common identity for defining paging occasion for the wireless device for paging from the first network slice and the second network slice. The wireless device is further configured to use the obtained common identity for determining when to listen for a paging message from the first network slice.

According to yet still another aspect the object is achieved by providing a radio network node for handling communication for a wireless device in a communication network. The communication network comprises partitioned sets of functionalities wherein a first set of functionalities belongs to a first network slice supporting the wireless device, and a second set of functionalities belongs to a second network slice supporting the wireless device, and which first and second sets of functionalities are separated from one another and other sets of functionalities out of a total set of functionalities in the communication network. The radio network node is configured to generate a common identity for defining paging occasion for the wireless device for paging from the first network slice and the second network slice. The radio network node further being configured to provide the generated common identity to the wireless device and/or a core network node serving the first network slice during attachment of the wireless device to the core network node.

It is furthermore provided herein a computer program comprising instructions, which, when executed on at least one processor, cause the at least one processor to carry out any of the methods above, as performed by the core network node, the radio network node or the wireless device. It is additionally provided herein a computer-readable storage medium, having stored thereon a computer program comprising instructions which, when executed on at least one processor, cause the at least one processor to carry out the method according to any of the methods above, as performed by the core network node, the radio network node or the wireless device.

Embodiments herein introduce an efficient manner of enabling sliced network structuring and usage by introducing the common ID for enabling an energy efficient paging procedure at the wireless device when being paged from a network slice. The wireless device is paged from a plurality of network slices in one time interval being defined by the common ID. Embodiments herein thus handle the communication for the wireless device in an efficient manner as the wireless device only listens for paging during this time interval.

BRIEF DESCRIPTION OF THE DRAWINGS

Embodiments will now be described in more detail in relation to the enclosed drawings, in which.

DETAILED DESCRIPTION

As part of developing embodiments herein a problem has first been identified. A management system may comprise a domain manager (DM), also referred to as the operation and support system (OSS) node managing the radio network nodes. A DM may further be managed by a network manager (NM). The radio network nodes may be interfaced by X2 and/or S1 interfaces, whereas an interface between two DMs is referred to as Itf-P2P. The management system may configure the radio network nodes, as well as receive observations associated with features in the radio network nodes. For example, DM observes and configures radio network nodes, while NM observes and configures DM, as well as the radio network nodes via DM. By means of configuration via the DM, NM and related interfaces, functions over the X2 and S1 interfaces can be carried out in a coordinated way throughout the RAN, eventually involving the Core Network, i.e. MME and S-GWs.

Figure 1:
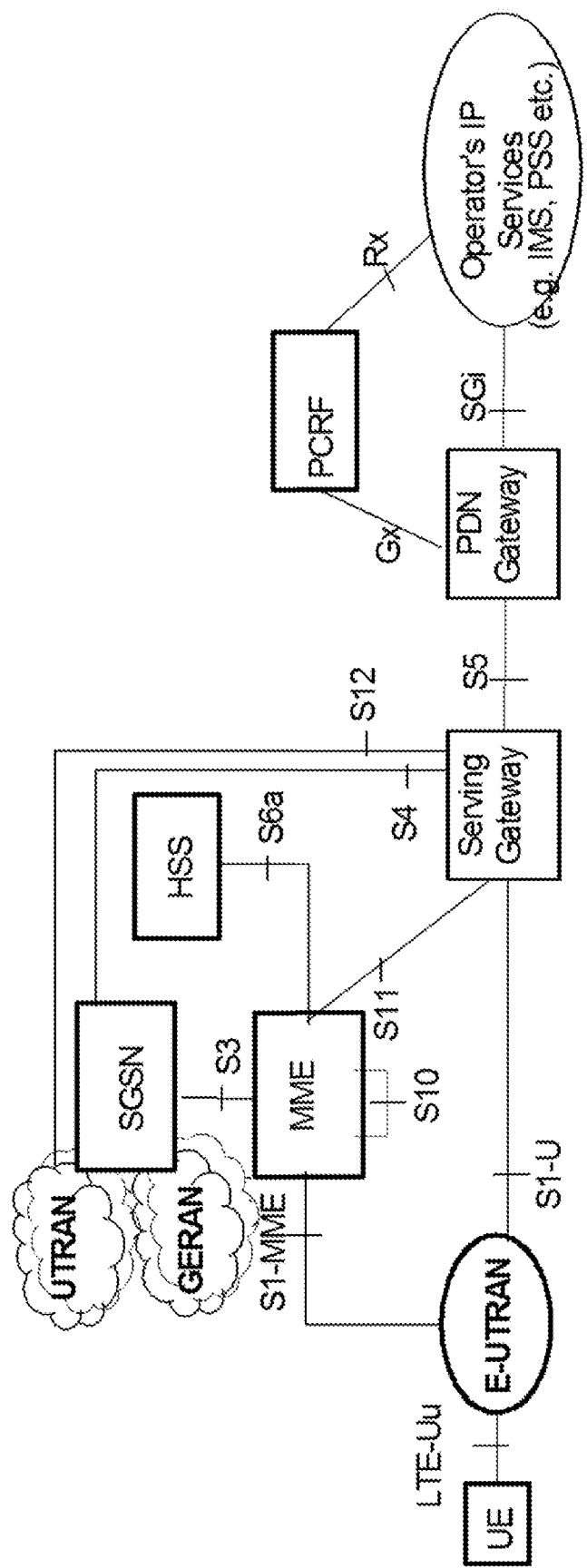
FIG. 1 is a schematic overview depicting a communication network according to prior art.
Figure 2:
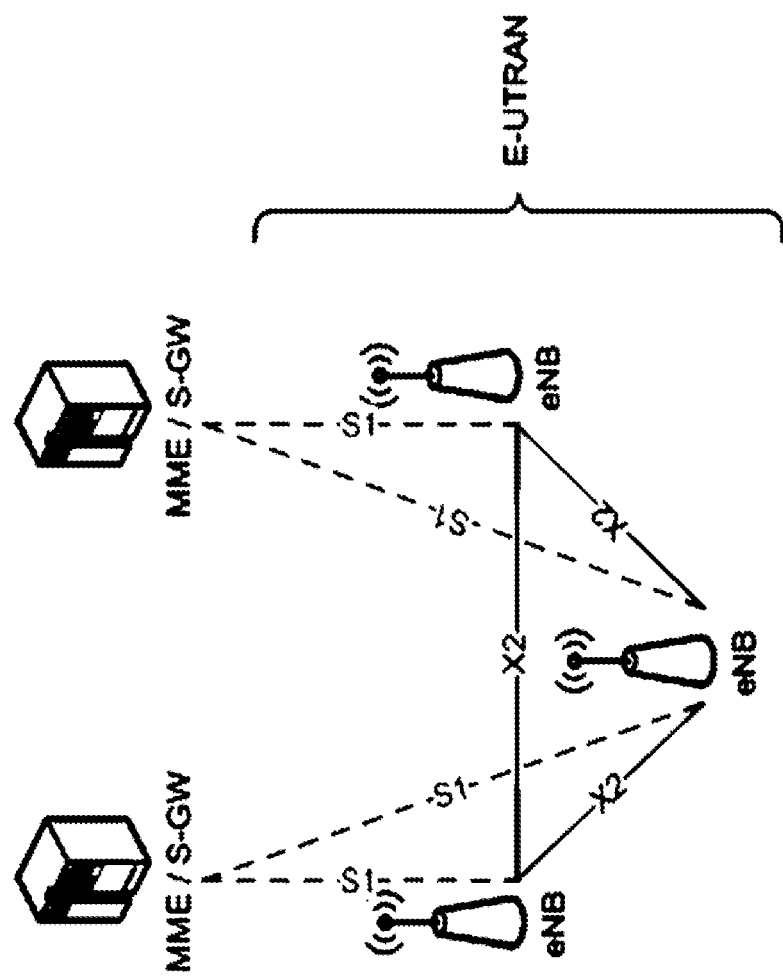
FIG. 2 is a schematic overview depicting a radio access network in connection with a core network.
Figure 3:
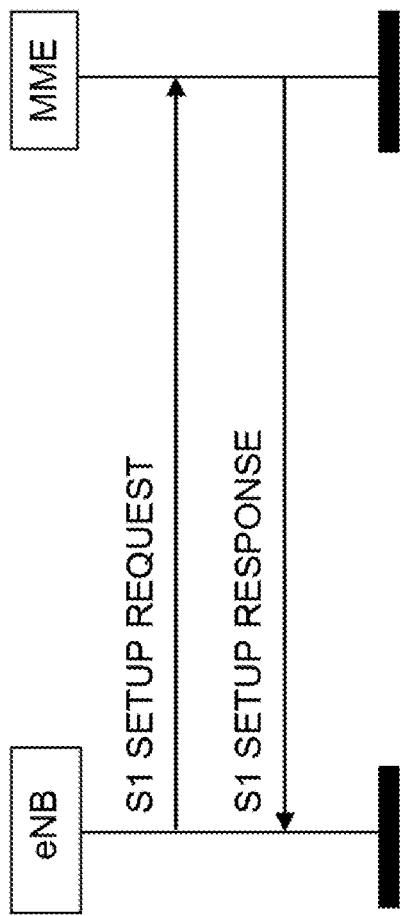
FIG. 3 is a signalling scheme according to prior art.
Figure 4:
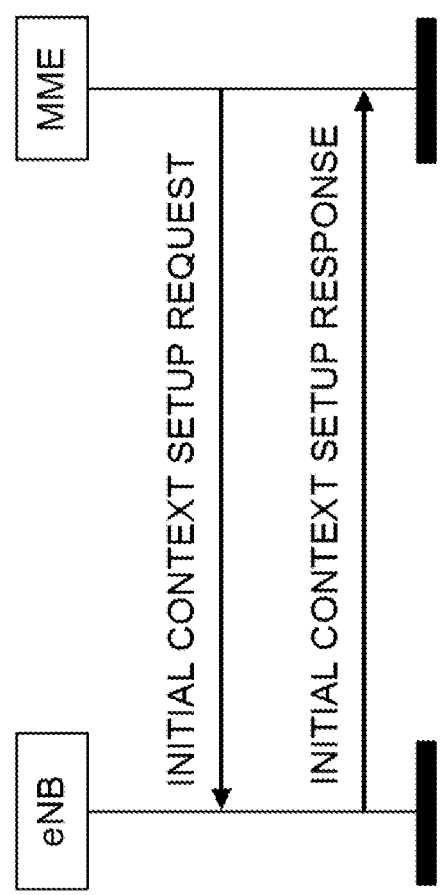
FIG. 4 is a signalling scheme according to prior art.
Figure 5:
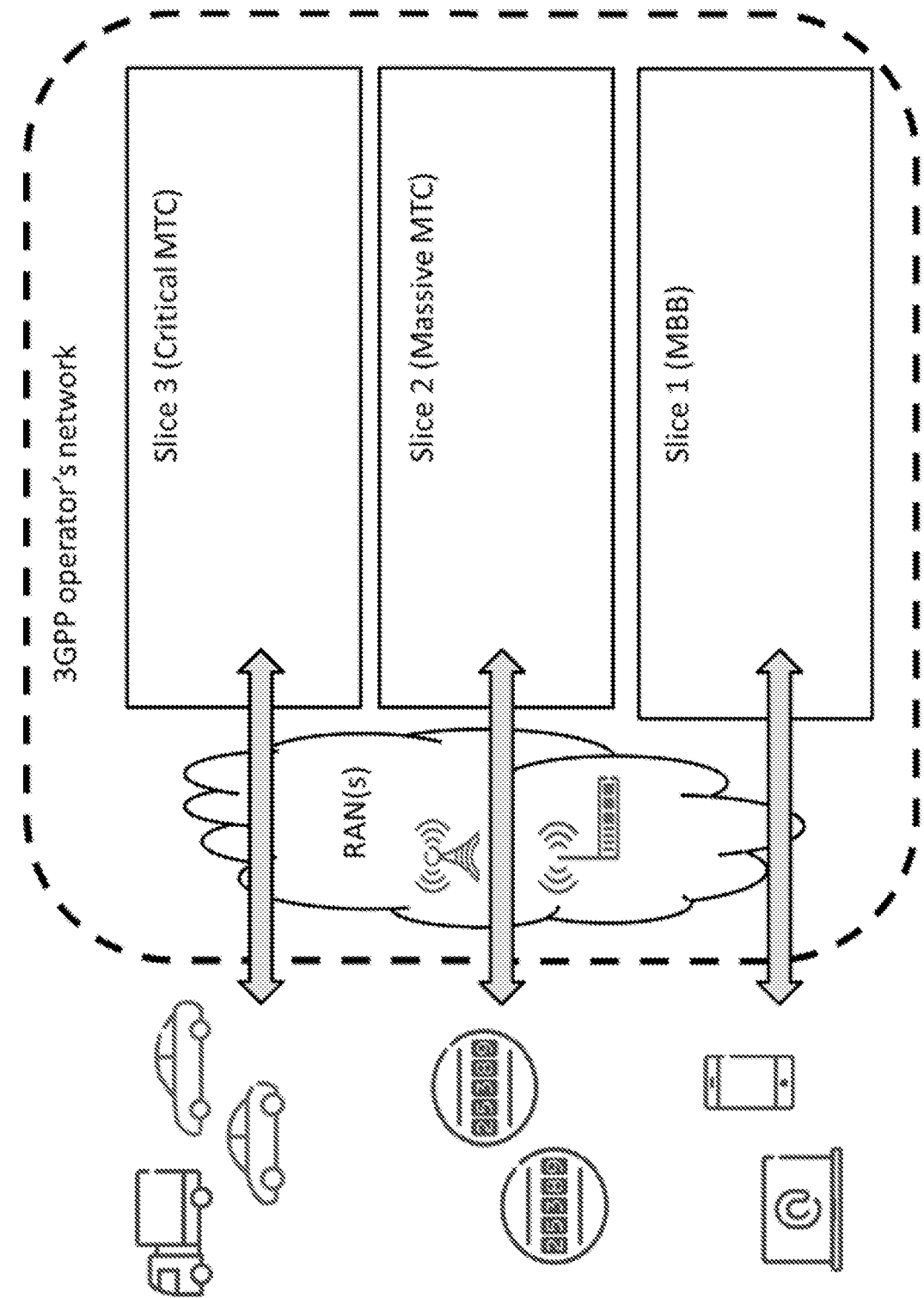
FIG. 5 is a schematic overview depicting an example of a slicing of a core network according to prior art.
Figure 6:
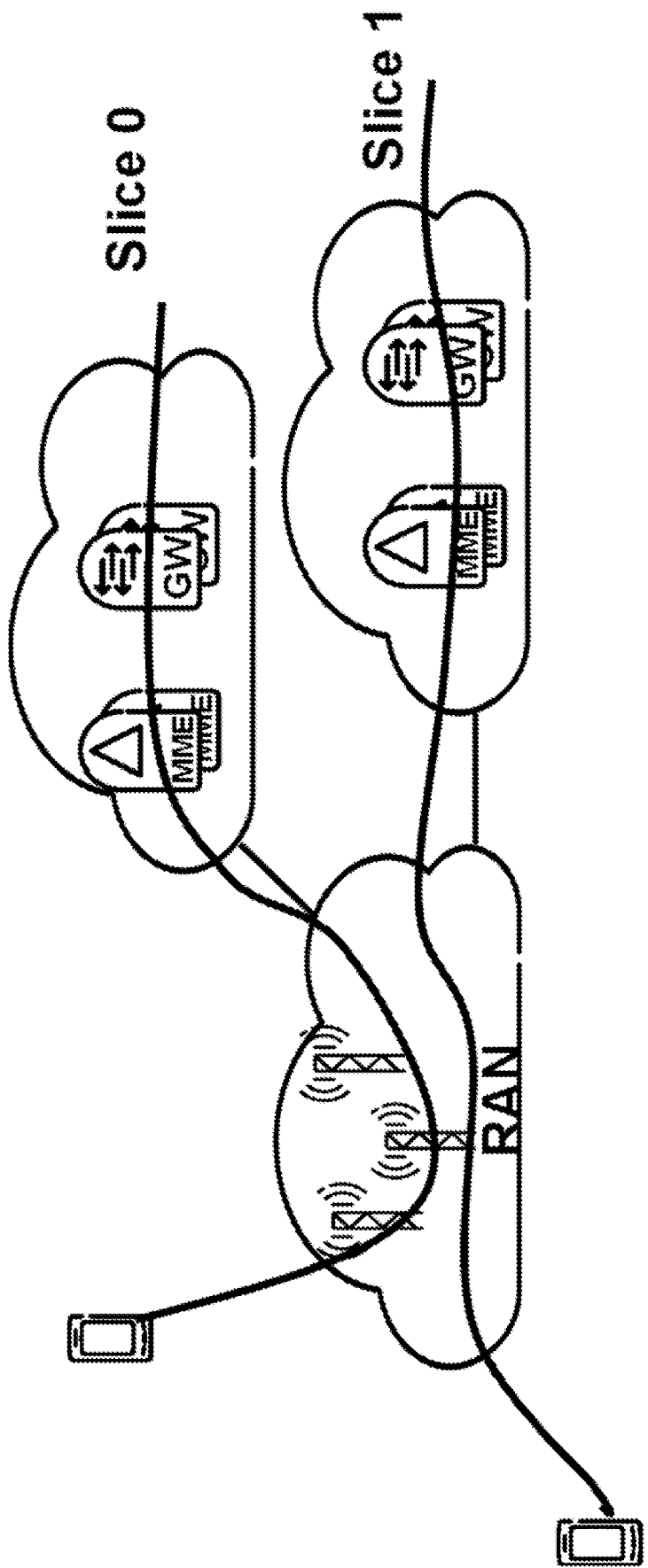
FIG. 6 is a schematic overview depicting an example of a slicing of a core network.

Network slicing is about creating logically separated partitions of the network, addressing different business purposes. These "network slices" are logically separated to a degree that they can be regarded and managed as networks of their own. The network slicing may apply to both LTE based networks and 5G Radio Access Technology (RAT). The network slicing supports business expansion, i.e. improving the cellular operator's ability to serve other industries, e.g., by offering connectivity services with different network characteristics, such as performance, security, robustness, and complexity. One shared Radio Access Network (RAN) infrastructure, comprising one or more RANs, connects to several Evolved Packet Core (EPC) instances, e.g. one EPC instance per network slice. As the EPC functions are being virtualized, it is assumed that the operator shall instantiate a new Core Network (CN) when a new slice should be supported. This architecture is shown in FIG. 6. Slice 0 can for example be a Mobile Broadband slice and Slice 1 can for example be a Machine Type Communication network slice. In addition, it is also possible that parts of the EPC are shared between the different network slices. One such example of shared EPC functionality is MME.

Figure 7:
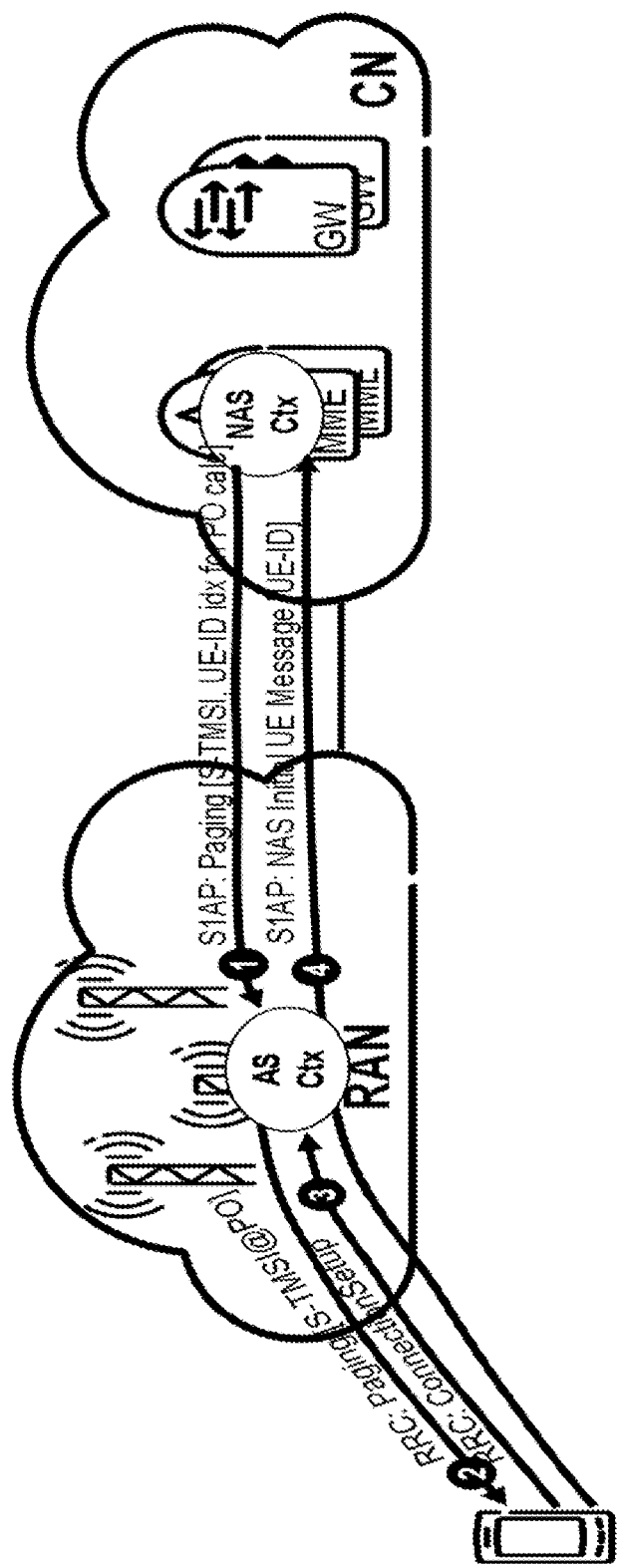
FIG. 7 is a signalling scheme for paging a wireless device according to prior art.

In current LTE/EPC system, paging is executed as shown in FIG. 7 for a wireless device in RRC_IDLE and EMM-REGISTERED states.

1. MME transmits a paging indication such as a Paging Request message (such as S1-AP PAGING) to radio network node with SAE Temporary Mobile Subscriber Identity (S-TMSI) or International Mobile Subscriber Identity (IMSI) for UE identification, and UE Identity Index Value for Paging Frame (PF) and Paging Occasion (PO) calculation. Typically the paging indication is sent to multiple radio network nodes that are serving any cells belonging to the current registration area of the wireless device, e.g. a list of Tracking Areas.
2. The radio network node will transmit Paging message at dedicated PF/PO, based on the received UE Identity Index Value, with S-TMSI (or IMSI) information as the paging identity of the wireless device. Paging Frame (PF) and/or Paging Occasion (PO) are calculated in the radio network node, based on the UE identity Index Value provided by MME. The UE identity Index Value is based on IMSI, and typically calculated as IMSI mod 1024.
3. If wireless device receives paging on its PO with a matching S-TMSI, the wireless device will trigger RRC connection Setup also including the S-TMSI of the wireless device and the NAS Service Request message, as response to the paging.
4. The radio network node uses the received S-TMSI to address the correct MME instance and forwards the NAS Service Request message to the MME in the S1AP INITIAL UE MESSAGE message. This message also triggers the establishment of S1AP association for the wireless device over S1-MME interface.

In a sliced network, with wireless devices which are capable to attach to multiple network slices, a problem has been identified with battery consumption in these wireless devices when they are in RRC idle mode, i.e. in RRC_IDLE state, and are listening for paging. The reason is that the wireless device identity, for example IMSI, for each slice for this wireless device may be provisioned independently and without any coordination as the identity is stored on the (Universal) Subscriber identity module (U)SIM and the (U)SIMs are separately distributed for the different network slices. IMSI belongs to the subscription which in its turn belongs to USIM application which in its turn resides on Universal Integrated Circuit Card (UICC) card/chip which is hold by wireless device. This results in uncorrelated PF/PO value between network slices. When the wireless device is in RRC idle state, it needs to listen to PF/PO for all attached slices within a Discontinuous Reception (DRX) cycle, which means increased battery consumption of the wireless device for each additional attached slice. For example, if the wireless device holds two different (U)SIMs, and IMSIs, and is attached to two network slices then it will need to wake up and listen to paging information independently for both network slices. This results in unnecessary battery consumption in the wireless device and embodiments herein provide a mechanism that allows for coordination of the PF/PO for one wireless device connected to multiple network slices.

Figure 8:
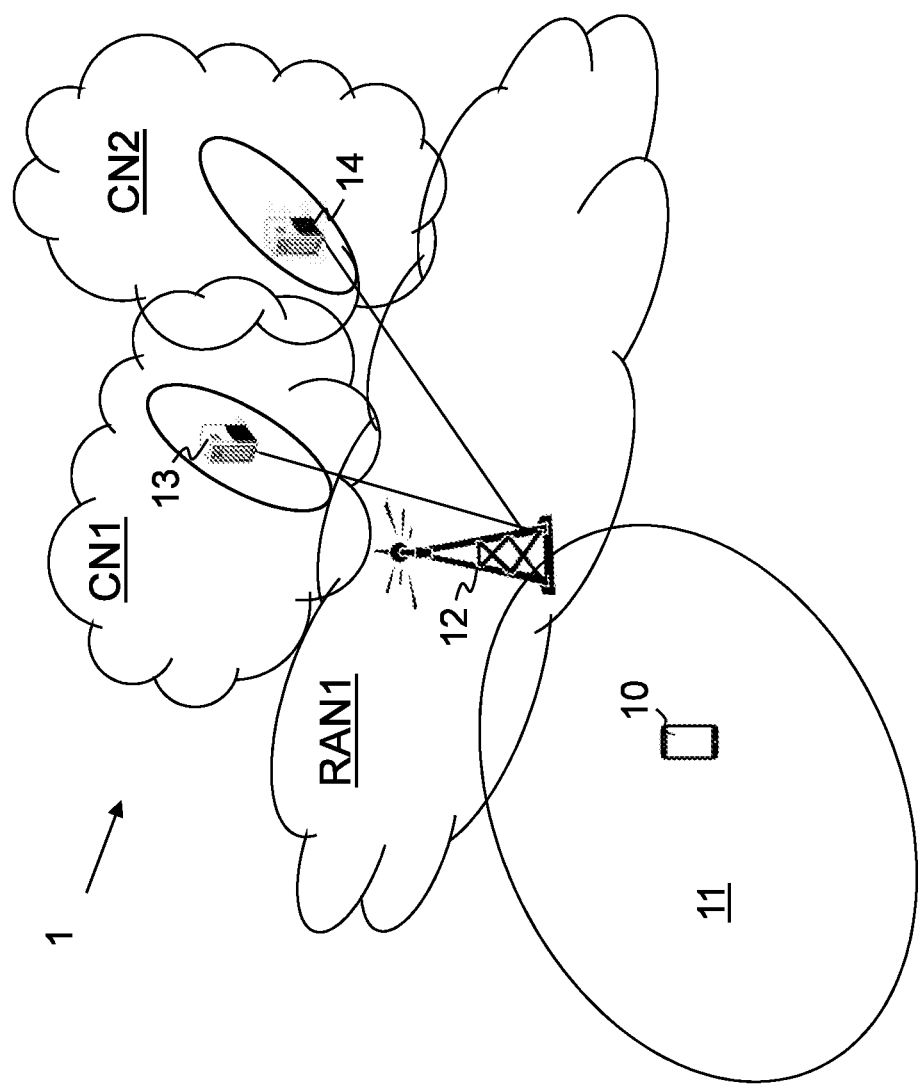
FIG. 8 is a schematic overview depicting a communication network according to embodiments herein.

Embodiments herein relate to communication networks in general. FIG. 8 is a schematic overview depicting a communication network 1. The communication network 1 comprises one or more RANs, one RAN (RAN1) is shown in FIG. 8, connected to one or more of CNs, exemplified as a first CN (CN1) and a second CN (CN2), all packet switched core networks. The communication network 1 may use a number of different technologies, such as Wi-Fi, Long Term Evolution (LTE), LTE-Advanced, 5G, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are applicable also in further development of the existing communication systems such as e.g. 3G and LTE.

In the communication network 1, wireless devices e.g. a wireless device 10 such as a mobile station, a non-access point (non-AP) STA, a STA, a user equipment and/or a wireless terminal, are connected via the one or more RANs, to the one or more CNs. It should be understood by those skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or any device communicating within a cell or service area.

The communication network 1 comprises a radio network node 12 providing radio coverage over a geographical area, a first service area 11, of a first radio access technology (RAT), such as LTE, UMTS, Wi-Fi or similar. The radio network node 12 may be a radio access network node such as radio network controller or an access point such as a wireless local area network (WLAN) access point or an Access Point Station (AP STA), an access controller, a base station, e.g. a radio base station such as a NodeB, an evolved Node B (eNB, eNodeB), a base transceiver station, Access Point Base Station, base station router, a transmission arrangement of a radio base station, a stand-alone access point or any other network unit capable of serving a wireless device within the service area served by the radio network node 12 depending e.g. on the first radio access technology and terminology used. The first and second core networks are virtually network sliced into one or more of network slices, each network slice or core network slice supports one or more type of wireless devices and/or one or more type of services i.e. each network slice supports a different set of functionalities. Network slicing introduces the possibility that the network slices are used for different services and use cases and these services and use cases may introduce differences in the functionality supported in the different network slices. Each network slice may comprise one or more network nodes or elements of network nodes providing the services/functionalities for the respective network slice. Each network slice may comprise a network node such as a RAN node or a core network node e.g. Radio Software Defined Networking (SDN) nodes, MMEs, S-GWs, Serving GPRS Support Nodes (SGSN), or corresponding nodes in e.g. a 5G network or similar. The GPRS meaning General Packet Radio Services. For example, a first network slice for e.g. MBB devices may comprise a first core network node 13 of the CN1. A second network slice for e.g. a certain enterprise may comprise a second core network node 14 of the CN2. Each network slice supports a set of functionalities out of a total set of functionalities in the communication network. E.g. the first core network node 13 supports a first set of functionalities out of the total set of functionalities in the communication network 1. The first set of functionalities is separated from different sets of functionalities out of the total set of functionalities in the communication network 1. E.g. the first set of functionalities being associated with MBB devices is separated or logically separated, e.g. using separated data storage or processing resources, from a second set of functionalities of the second network slice.

The first set of functionalities may use one or more resources in a core network of the communication network, which one or more resources are separated from other resources used by a different set of functionalities, i.e. different network slices, out of the total set of functionalities in the communication network 1. The resources may then be dedicated or virtually dedicated for each set of functionalities or network slice. Thus, the core network node may be separated from other core network nodes supporting other sets of functionalities out of the total set of functionalities in the communication network. Separated meaning herein physically separated wherein the core network nodes may be executed on different hardware platforms and therefore using different resources of the hardware, and/or logically separated wherein the core network nodes may be executed on a same hardware platform and use different resources such as memory parts or resources of processor capacity but may also use some same resources of the hardware e.g. a single physical core network node may be partitioned into multiple virtual core network nodes.

Hence, the first core network node 13 supports the first set of functionalities out of the total set of functionalities in the communication network, which first set of functionalities belongs to the first network slice of the first core network, and may be separated from another set of functionalities out of the total set of functionalities in the communication network. The second set of functionalities out of a total set of functionalities in the communication network may be different, partly the same or similar as ones supported by the first network slice.

Figure 9:
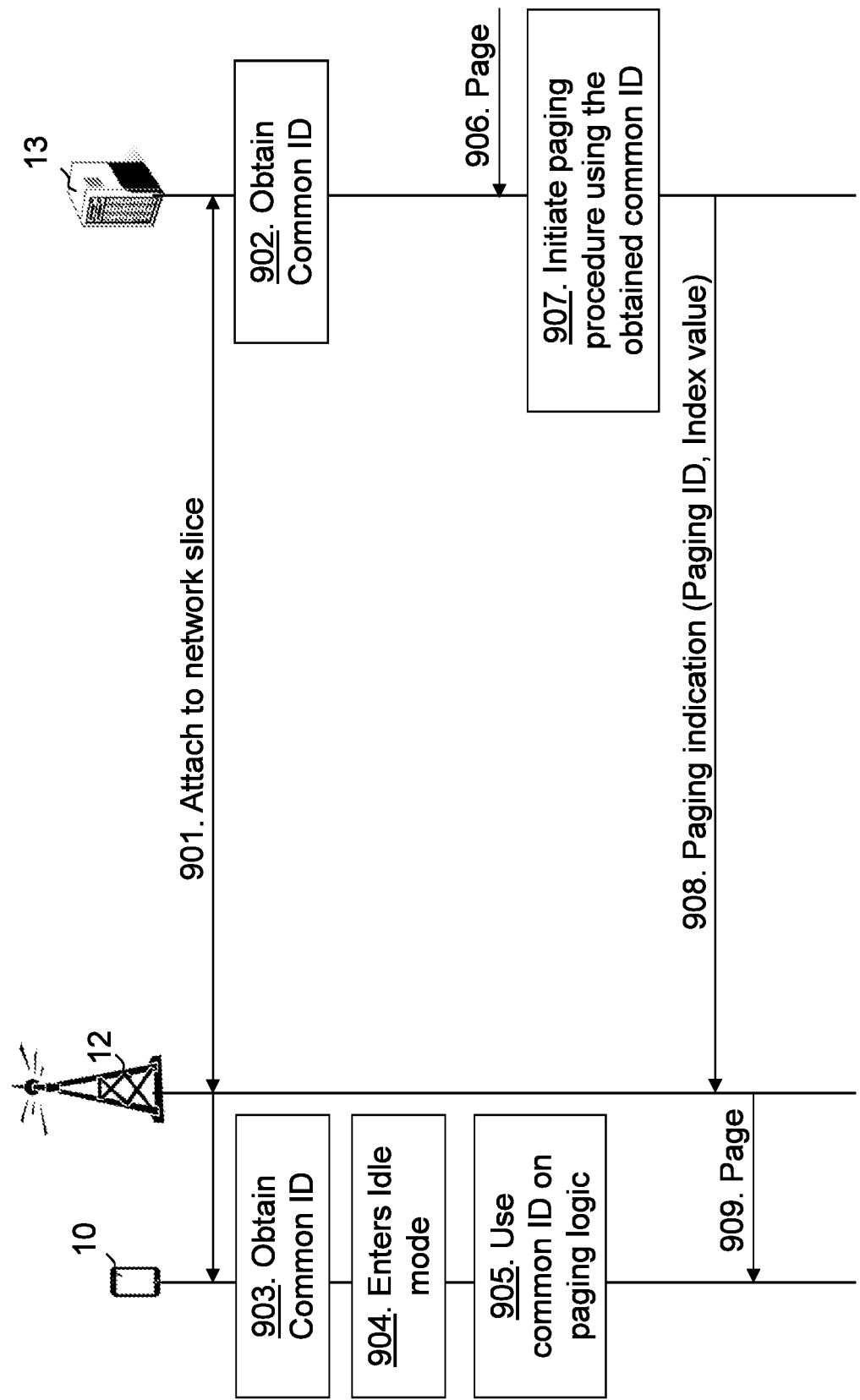
FIG. 9 is a combined flowchart and signalling scheme according to embodiments herein.

Embodiments herein introduce a common identity for defining paging occasion for the wireless device 10 for paging from multiple network slices such as the first and second network slice. The common identity (Common ID), also referred to as Common UE Paging Occasion ID, may be used for PF/PO calculation in all the network slices. The Common ID can be generated by the wireless device 10, the radio network node 12 or by any of the core network nodes. This Common ID may be provided or distributed to each network slice during first attach on any network slice, and to wireless device 10 when it attaches to the first network slice. When the first core network node 13 needs to page the wireless device 10, an Index Value may be sent to the radio network node 12, which index value may be based on PO/PF calculated based on the Common ID instead of the IMSI for the specific network slice. The wireless device 10 may then be listening on paging based on the Common ID and able to receive paging from multiple network slices during the same paging occasion, same time interval, and thus the energy consumption is reduced. In prior art, the "on time" for wireless device in RRC idle state for paging will be "n/paging cycle" where n is the number of attached network slices, and according to embodiments herein, the wakeup time for the wireless device 10 in RRC idle state for paging will be "1/paging cycle", independent on number of attached network slices. This means decreased battery usage and extended battery lifetime FIG. 9 is a combined flowchart and signaling scheme according to embodiments herein for handling communication for the wireless device 10. The core network side implements a plurality of different core network nodes supporting different network slices. Each core network node may be a single MME (as shown) or a pool of MMEs, and additional nodes are likely to exist both for the wireless device 10 and other wireless devices. The first radio network node 12 is connected to the different core network nodes using e.g. S1-MME interfaces. It should here be understood that the first and second network slice may be provided by the same core network node but is exemplified herein as two different core network nodes.

Action 901. The wireless device 10 attaches or connects to the first core network node 13.

Action 902. The first core network node 13 obtains the common ID for defining paging occasion for the wireless device 10 for paging from multiple network slices such as the first and second network slice.

Action 903. The wireless device 10 obtains the common ID. E.g. the first core network node 13 may generate the common ID and transmit the common ID to the wireless device 10 or vice versa.

Action 904. The wireless device 10 goes into idle mode, e.g. the wireless device 10 enters RRC_IDLE state.

Action 905. The wireless device 10 uses the common ID for paging logic. E.g. the wireless device 10 determines when to listen for paging based on the obtained common ID, hence, the wireless device uses the obtained common ID for determining when to listen for a paging message from the first network slice (as well as from the second network slice).

Action 906. The first core network node 13 receives an indication for paging the wireless device 10.

Action 907. The first core network node 13 then initiates a paging procedure for the wireless device 10 using, or based on, the obtained common ID.

Action 908. The first core network node 13 transmits a paging indication to the radio network node 12. The paging indication may comprise paging identity of the wireless device 10, and an index value calculated from the common ID.

Action 909. The radio network node 12 then performs the paging, transmits a paging message, of the wireless device 10 in a paging occasion based on the index value and thus on the common ID. For example, the paging occasion may be PF/PO calculated based on the index value. This paging occasion will be the same for paging from any network slice connected to the wireless device 10 and the wireless device 10 does only have to listen to this common paging occasion resulting in reduced consumption of energy.

Figure 10:
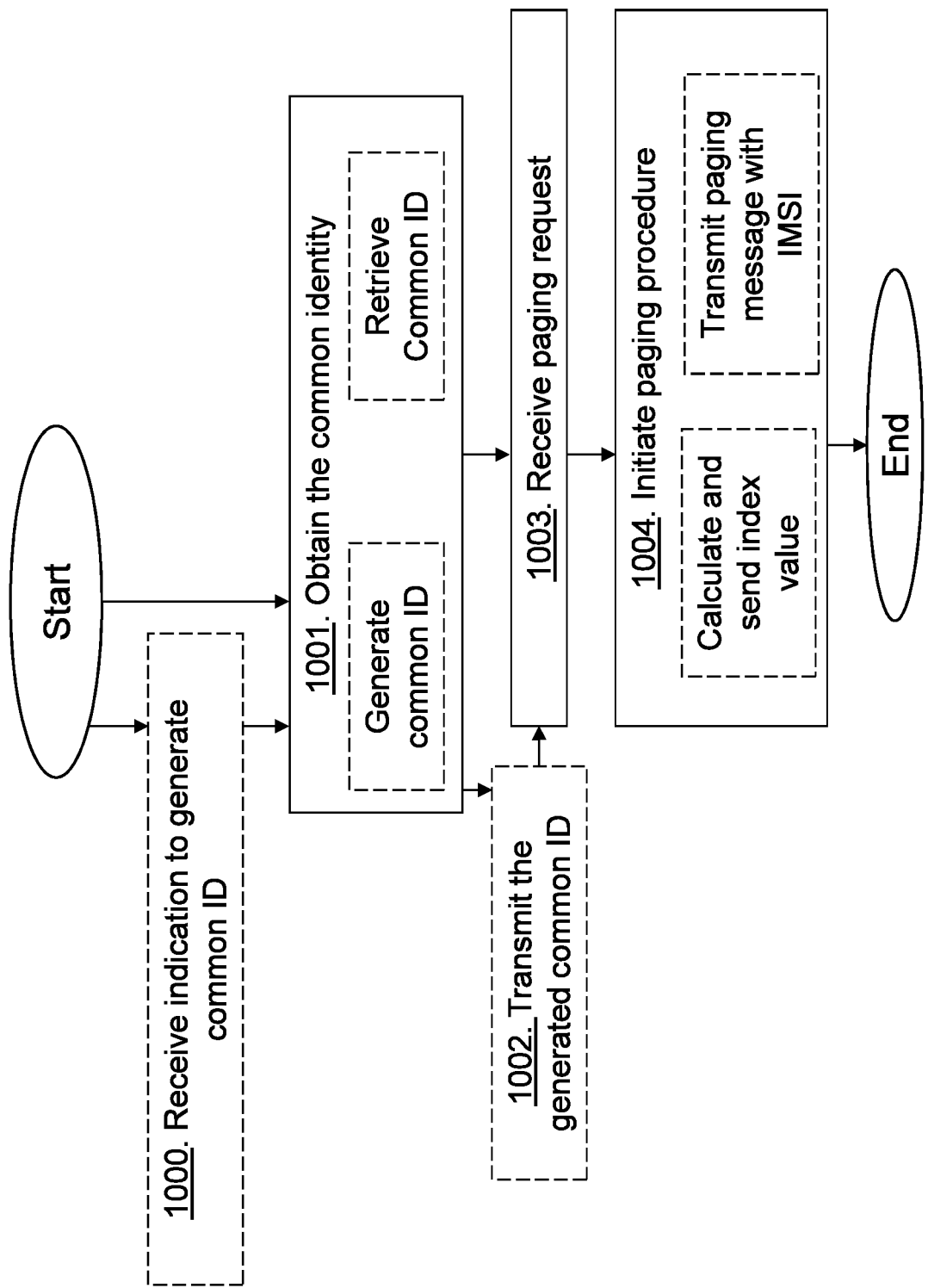
FIG. 10 is a schematic flowchart depicting a method performed by a core network node according to embodiments herein.

The method actions performed by the core network node, exemplified herein as the first core network node 13 but may also be the second core network node 14, for handling communication for the wireless device 10 in the communication network 1 according to some embodiments will now be described with reference to a flowchart depicted in FIG. 10. The actions do not have to be taken in the order stated below, but may be taken in any suitable order. Actions performed in some embodiments are marked with dashed boxes. The communication network 1 comprises partitioned sets of functionalities wherein the first set of functionalities belongs to the first network slice supporting the wireless device 10, and the second set of functionalities belongs to the second network slice supporting the wireless device 10. The first and second sets of functionalities are separated from one another and other sets of functionalities out of a total set of functionalities in the communication network 1.

Action 1000. The core network node may receive from the wireless device 10, an indication to generate the common identity.

Action 1001. The core network node obtains the common identity for defining paging occasion for the wireless device 10 for paging from the first network slice and the second network slice. The core network node may obtain the common identity by retrieving the common identity when attaching the wireless device 10 to the core network node 13, e.g. from the radio network node 12 or the wireless device 10. The core network node may obtain the common ID by generating the common ID at the core network node. The core network node may generate the common identity by generating a random number, which random number is used as the common identity. The common identity may be generated based on the IMSI, of the wireless device 10, or an International Mobile Equipment Identity (IMEI) of the wireless device 10. For example, the first core network node 13 which is attached to the wireless device 10 is responsible for generation and distribution of Common ID. As stated in action 1000, the wireless device 10 may indicate the need to create the Common ID to the first core network node 13. This may be needed as the first core network node 13 is not aware of the wireless device 10 performing a first attach to a network slice. The generation of the Common ID, the first core network node 13 generates a random number, with a distribution good enough to spread the pages of wireless devices over all the possible paging occasions. The Common ID may be 10 bits long, or shorter or longer than 10 bits. The first core network node 13 may use the IMSI or the IMEI related to the attachment (or attach) performed by the wireless device 10 and perform calculations of the Common ID based on the IMSI or the IMEI. Also in this case the Common UE Paging Occasion ID may be 10 bits long, or shorter or longer than 10 bits.

Action 1002. The core network node may transmit the generated common identity to the wireless device 10 during an attachment to the first network slice from the wireless device 10. The generated common identity may be transmitted to the wireless device 10 after a NAS security setup to the wireless device 10 is completed. Thus, after the Common ID is generated during first initial attach to the first core network node 13, the first radio network node 13 may transmit this common ID to the wireless device 10, and during attach to additional slice core network nodes, the easiest way for transmit this common ID to additional slice core network nodes (e.g. MMEs) is to have the wireless device 10 transmitting the common ID to the additional slice core network nodes (e.g. MMEs).

Action 1003. The core network node receives a paging request for the wireless device 10 from the first network slice when the wireless device 10 is in idle mode.

Action 1004. The core network node initiates a paging procedure of the wireless device 10 by using the obtained common identity to define when to page the wireless device 10. For example, the core network node may initiate the paging procedure by calculating the index value for the wireless device 10 based on the obtained common identity. The index value is sent, in a paging indication with the paging identity of the wireless device 10, to the radio network node 12, which serves one or more cells in a current registration area for the wireless device 10. The index value is used, by the radio network node 12, to define when to page the wireless device 10. The index value may indicate a time offset when to page the wireless device 10. The index value may be used to calculate the PF/PO for the wireless device 10. The core network node may further, when one or more condition is fulfilled e.g. no common ID is found, transmit a paging indication with IMSI as identifier, where IMSI is used as base for the index value in the paging indication.

In some embodiments, the core network node where the wireless device 10 attaches to initially assigns the Common ID. At subsequent registrations (or attachment or attach) to additional network slices, e.g. to the second core network node 14, the wireless device 10 may propagate the previously assigned Common ID in an RRC message that carries the NAS Protocol Data Unit (PDU), e.g. during attachment, to the radio network node 12. The radio network node 12 forwards the Common ID over the S1 to the second core network node 14 at the same time when forwarding the NAS PDU. The inclusion of the Common ID in the RRC protocol avoids the need for 'inter-NAS-entities' communication in the wireless device 10. The Common ID could also be sent to the wireless device 10 in a NAS Attach Accept message and that particular NAS entity in the wireless device 10 would make it available to the Access Stratum (AS) layer in the wireless device 10 similar as it happens with the S-TMSI today.

Figure 11:
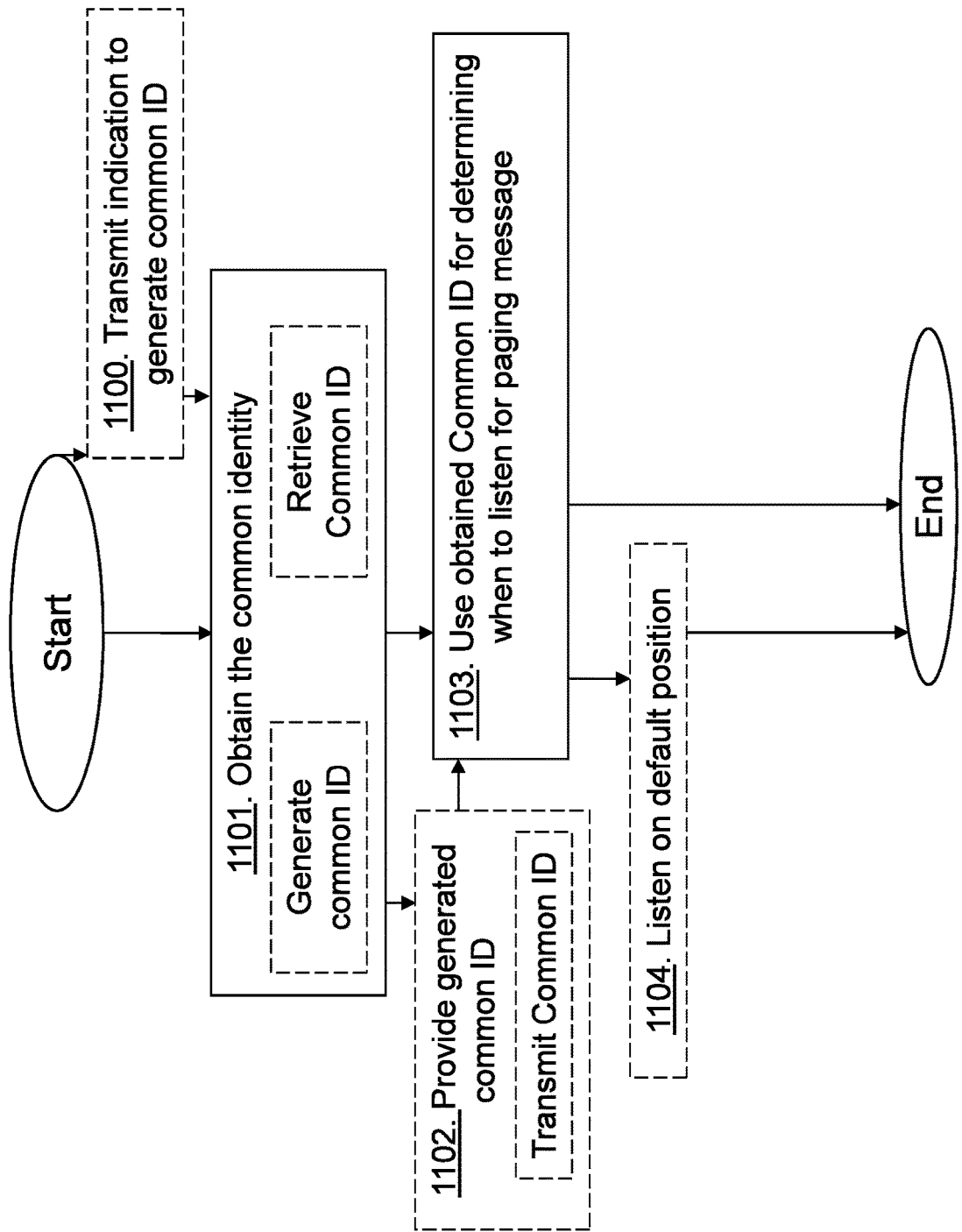
FIG. 11 is a schematic flowchart depicting a method performed by a wireless device according to embodiments herein.

The method actions performed by the wireless device 10 for handling the communication for the wireless device 10 in the communication network 1 according to some embodiments will now be described with reference to a flowchart depicted in FIG. 11. The actions do not have to be taken in the order stated below, but may be taken in any suitable order. Actions performed in some embodiments are marked with dashed boxes. The communication network 1 comprises partitioned sets of functionalities wherein the first set of functionalities belongs to the first network slice supporting the wireless device 10, and the second set of functionalities belongs to the second network slice supporting the wireless device 10. The first and second sets of functionalities are separated from one another and other sets of functionalities out of a total set of functionalities in the communication network 1.

Action 1100. The wireless device 10 may transmit the indication to generate the common ID to the first core network node 13.

Action 1101. The wireless device 10 obtains the common ID for defining paging occasion for the wireless device 10 for paging from the first network slice and the second network slice. The wireless device 10 may obtain the common identity by generating a random number, which random number is used as the common identity. The common identity may be generated based on the IMSI of the wireless device 10, or the IMEI of the wireless device 10. The common ID may alternatively be obtained by retrieving the common identity when attaching the wireless device 10 to the first core network node 13, e.g. received from the first CN node 13 or from the radio network node 12.

Action 1102. The wireless device 10 may, when the wireless device 10 has obtained the common identity by generating the common identity, provide the generated common identity to the first core network node 13 serving the first network slice and/or the radio network node 12 serving the wireless device 10 during attachment to the first core network node 13. The wireless device 10 may provide the common ID by transmitting the generated common identity to the core network node during the attachment, either as a parameter in a NAS message or in a dedicated NAS message. The common ID may be sent using RRC to the radio network node 12, for further sending via "S1AP" to the first CN node. The common identity may be provided by transmitting the generated common identity to the core network node after a NAS security setup to the core network node 13 is completed. The common identity may be provided by transmitting the generated common identity to the radio network node 12 after an RRC security setup to the radio network node 12 is completed.

Action 1103. The wireless device 10 uses the obtained common identity for determining when to listen for a paging message from the first network slice. Actually the common identity is used for listen to pagings, e.g. paging messages, from all network slices which are attached.

Action 1104. The wireless device 10 may listen for a paging message on a default position of a paging occasion.

Thus, in some cases the wireless device 10 is responsible for generation and distribution of Common ID. The wireless device 10 may generate a random number, with a distribution good enough to spread the pages over all the possible paging occasions. The random number may for example be a 10 bit long identifier, e.g. as the UE identity Index Value in the existing S1AP Paging message. In another example the random number is shorter or longer than 10 bits. The generated random number may then be used as the Common ID. Furthermore, the Common ID may be generated based on any of the IMSIs of the (U)SIMs the wireless device 10 is holding. This may be a single IMSI or any combination of more than one IMSI held by the (U)SIMs in the wireless device/UICC. Also in this case the Common ID may be 10 bits long, or shorter or longer than 10 bits. The Common ID may be generated based on the IMEI of the wireless device 10. Also in this case the Common ID may be 10 bits long, or shorter or longer than 10 bits. For distributing the common ID the wireless device 10 may transmit this common ID to every slice core network node during the initial attach to the core network node, either as a parameter to existing NAS message or in a new dedicated NAS message, e.g. using RRC to the radio network node 12, for further sending via "S1AP" to the first core network node.

In one embodiment the wireless device 10 that can connect to multiple network slices has been assigned a paging identifier such as an S-TMSI by each core network node hosting one of the network slices the wireless device 10 can connect to. The wireless device may then calculate the PF/PO deriving from each of the paging identifiers assigned to wireless device 10 for each core network node. The wireless device 10 may then deduce the most frequent set of PF/PO derived by each of the paging identifiers. When the wireless device then performs a first service request to attach to a specific network slice, the wireless device 10 may indicate to the radio network node 12 that the PF/PO on which paging messages should be sent is the set derived with the identifier producing the most frequent paging occasion occurrence. The wireless device 10 may signal a unique identifier for all the core network nodes supporting network slices or it can signal the identifier from which the set of PF/PO was derived and communicated to the radio network node 12. The radio network node 12 will make each core network node, supporting network slices where the wireless device 10 can connect, aware of the common ID selected by the wireless device 10.

Figure 12:
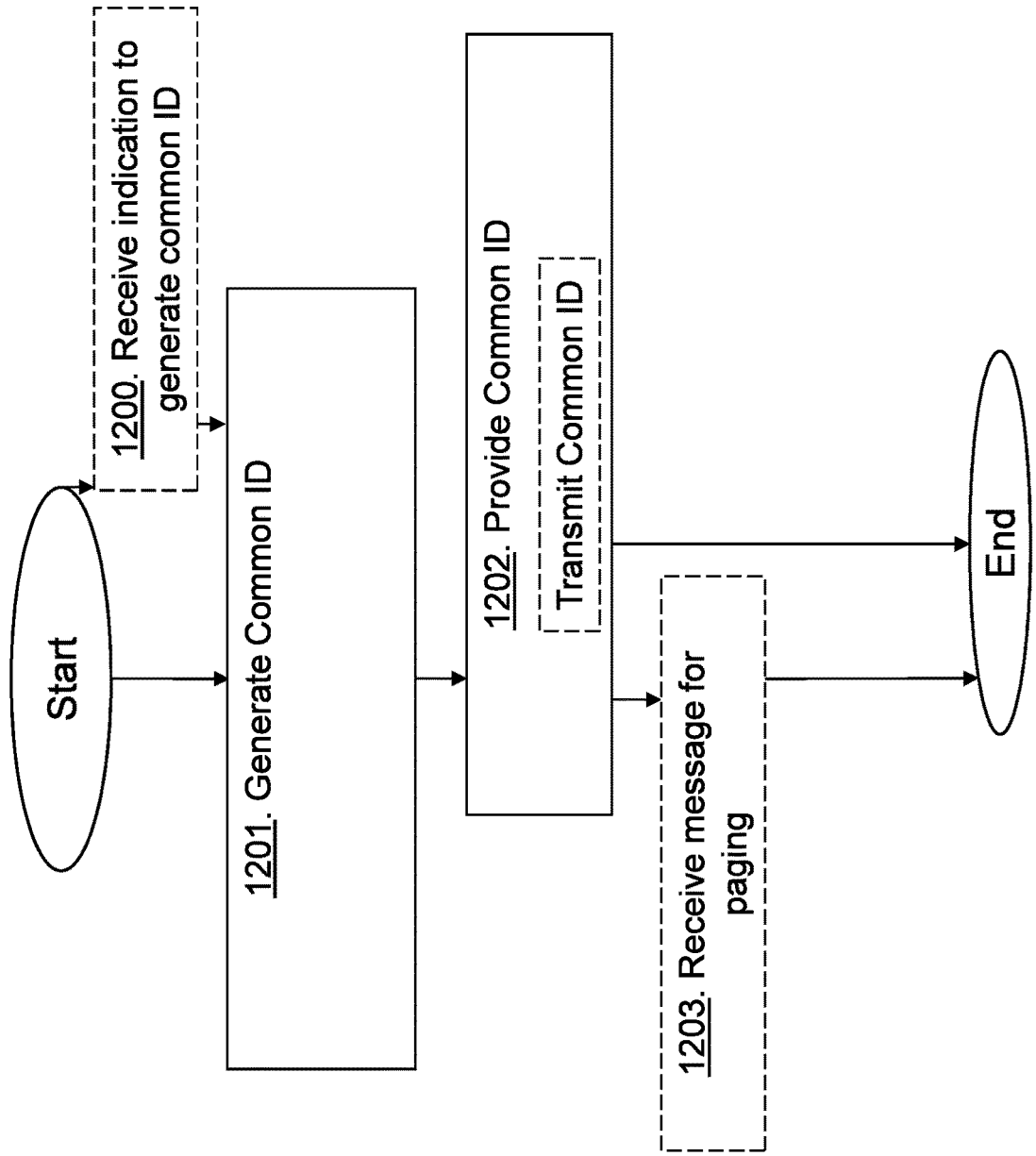
FIG. 12 is a schematic flowchart depicting a method performed by a radio network node according to embodiments herein.

The method actions performed by the radio network node 12 for handling communication for the wireless device 10 in the communication network 1 according to some embodiments will now be described with reference to a flowchart depicted in FIG. 12. The actions do not have to be taken in the order stated below, but may be taken in any suitable order. Actions performed in some embodiments are marked with dashed boxes. The communication network 1 comprises partitioned sets of functionalities wherein the first set of functionalities belongs to the first network slice supporting the wireless device 10, and the second set of functionalities belongs to the second network slice supporting the wireless device 10. The first and second sets of functionalities are separated from one another and other sets of functionalities out of a total set of functionalities in the communication network 1.

Action 1200. The radio network node 12 may receive the indication from the wireless device 10 to generate the common ID.

Action 1201. The radio network node 12 generates the common ID for defining paging occasion for the wireless device 10 for paging from the first network slice and the second network slice.

Action 1202. The radio network node 12 further provides the generated common ID to the wireless device and/or the first core network node 13 serving the first network slice during attachment of the wireless device 10 to the core network node 13. The radio network node 12 may generate a random number, which random number is used as the common identity. The radio network node 12 may provide the common identity by transmitting the generated common identity to the core network node over S1AP based protocol and/or the wireless device over a Radio Resource Control, RRC, based protocol. The radio network node 12 may provide the common identity by transmitting the generated common identity to the wireless device after an RRC security setup to the wireless device 10 is completed.

Action 1203. The radio network node 12 may further receive a paging indication for paging the wireless device 10 with IMSI of the wireless device. In this case the index value in the paging indication may be based IMSI. The radio network node 12 may transmit a paging message on a default position of a paging occasion for the wireless device 10. The radio network node 12 may also calculate the paging occasion based on the received index value and perform IMSI paging accordingly.

Hence, in some embodiments the radio network node 12 is responsible for generation and distribution of the common ID. The radio network node 12 may generate a random number, with a distribution good enough to spread the pages over all the possible paging occasions. Also in this case the Common ID may be 10 bits long, or shorter or longer than 10 bits. As stated in action 1200, the wireless device 10 may indicate the need to create the Common ID to the radio network node 12. This may be needed when the radio network node 12 is not aware of the wireless device 10 performing a first attach to a network slice.

After the common ID is generated e.g. during first initial attach to the first slice MME, the radio network node 12 may transmit this common ID to the first core network node 13 and the wireless device 10 through e.g. S1AP and RRC protocol messages. When attach to an additional core network node, such as the second core network node 14, sometimes this common ID is not available in the radio network node 12, e.g. RRC goes to idle mode after attach to the first network slice, and then the wireless device 10 attaches to additional slice, this common ID may be transmitted by the wireless device to the additional core network node/network slice.

Figure 13:
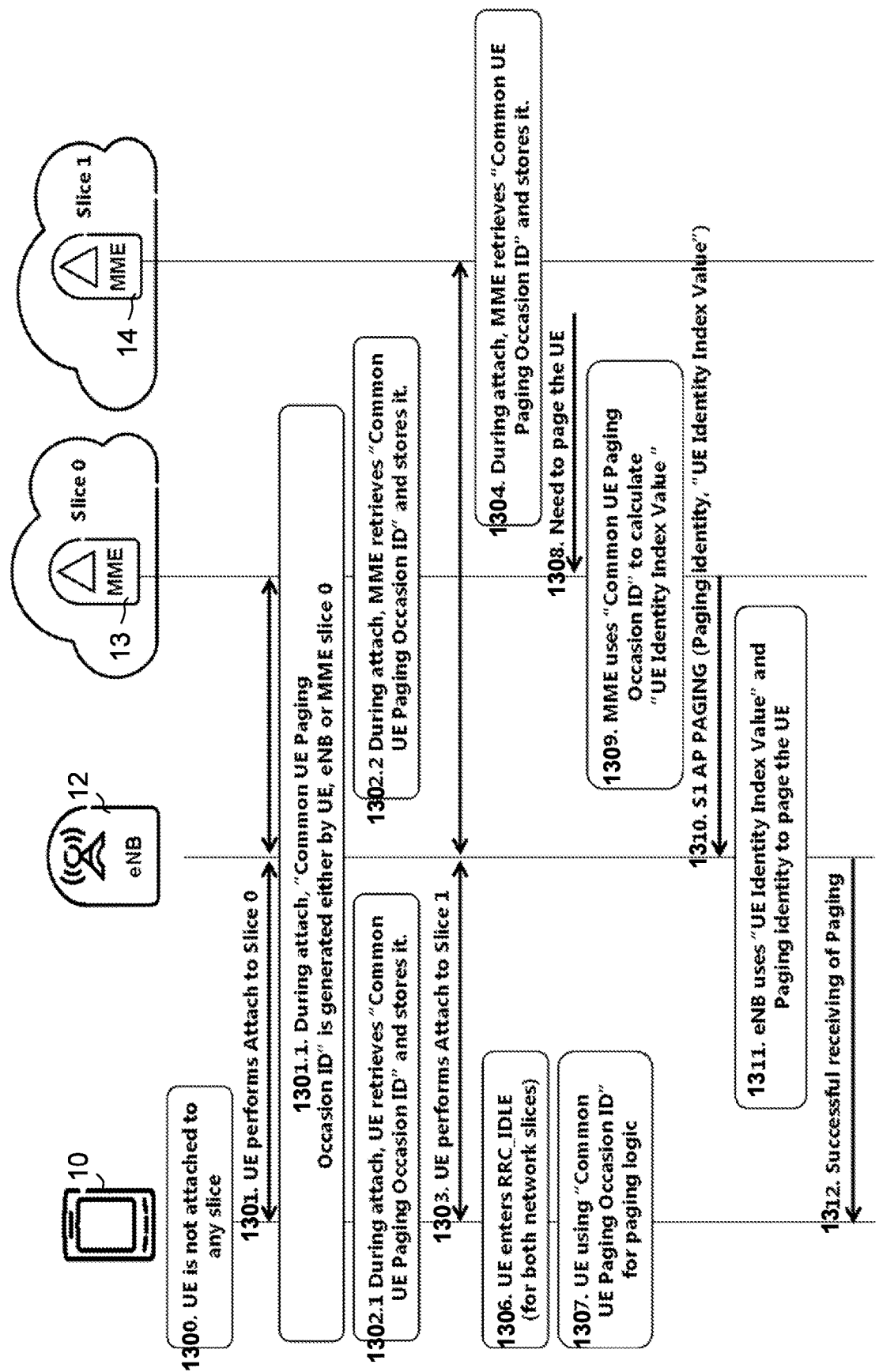
FIG. 13 is a combined flowchart and signalling scheme according to embodiments herein.

FIG. 13 is a schematic flowchart and signaling scheme according to embodiments herein.

Action 1300. The wireless device 10 (UE) is not attached to any slice.

Action 1301. The wireless device 10 performs an Attach to slice 0, being an example of the first network slice.

Action 1301.1 During the Attach "Common UE paging Occasion ID" is generated either by wireless device 10, radio network node 12 (eNB) or the first core network node 13 (MME in slice 0).

Action 1302.1 During the Attach, wireless device 10 retrieves "Common UE paging Occasion ID" and stores it.

Action 1302.2 During the Attach, the first core network node (MME) retrieves "Common UE paging Occasion ID" and stores it.

Action 1303. Wireless device 10 performs an Attach to Slice 1, being an example of the second network slice.

Action 1304. During the Attach the second core network node 14 (MME) retrieves the "Common UE paging Occasion ID" and stores it.

Action 1306. The wireless device 10 enters RRC_Idle state for both network slices.

Action 1307. The wireless device 10 uses "Common UE paging Occasion ID" for paging logic. For example, the wireless device uses the Common ID to calculate/determine paging offset from a synchronized frame to determine when to listen for paging messages from one or more network slices.

Action 1308. The first core network node 13 receives an indication that there is a need to page the wireless device 10.

Action 1309. The first core network node 13 uses the "Common UE paging Occasion ID" to calculate the index value also referred to as "UE identity Index value".

Action 1310. The first core network node 13 transmits a paging indication, e.g. S1AP paging comprising paging identity and the index value.

Action 1311. The radio network node 12 uses the index value, calculates PF/PO based on the received index value, and the paging identity to page the wireless device 10.

Action 1312. The wireless device 10 receives and detects the paging message from the radio network node in the paging occasion defined by the "Common UE paging Occasion ID". Hence, the wireless device successfully receives the paging.

In case of network failure in the first core network node 13, the Common UE paging Occasion ID" information may be lost. In order to establish paging between the first core network node 13 and the wireless device 10 in this case, a default PF/PO is defined. The first core network node 13 may then 1) Transmit paging indication with IMSI as identifier
2) Use IMSI as base for Index Value.

When the radio network node 12 receives this IMSI paging indication, it may

3) Transmit the paging on RRC with PF/PO based on the Index Value. (for backward compatibility) and/or
4) Transmit the paging on RRC with a default position of PF/PO, for wireless devices attached to multiple slices For all UEs which are capable to attach to multiple slices they may in RRC idle mode:

5) Listen for paging message on PF/PO based on the common ID
6) Listen for paging message on the default position of PF/PO With this extension, the wakeup time for the wireless device 10 in RRC idle state for paging will be increased to "2/paging cycle", independent on number of attached network slices, which is better than prior art.

The common ID can be exploited in an active man-in-the-middle (MitM) attack when the attacker intercepts and modifies in transit the original value of common ID transmitted during the Initial Attach procedure. Such modification may lead to a MME and radio network node using erroneous value of common ID when paging the wireless device effectively making the wireless device unable to answer the page and therefore causing denial of service (DoS). Thus the integrity of the generated common ID may need to be protected in transit.

One option to ensure integrity protection is to transmit this common ID after the NAS security setup is completed and all communication between the wireless device and the first core network node is protected.

Another option to ensure integrity protection for the core network node is to confirm the value of the received earlier common ID by sending to the wireless device 10 as a part of Security Mode Command message. The Security Mode Command message is integrity protected by NAS-Medium Access Control (MAC) therefore it won't be possible for an active attacker to modify its content without notice. If the wireless device 10 detects that this common ID value sent from the first core network node deviates from the one that the wireless device 10 has generated itself the wireless device 10 may either abort the further setup or simply accept the value provided by the first core network node. If the integrity verification of the complete Security Mode Command message fails, the wireless device 10 may act in the same way as a legacy wireless device.

In addition, the core network node may need to validate the structure of provided by common ID by performing input format check.

Figure 14:
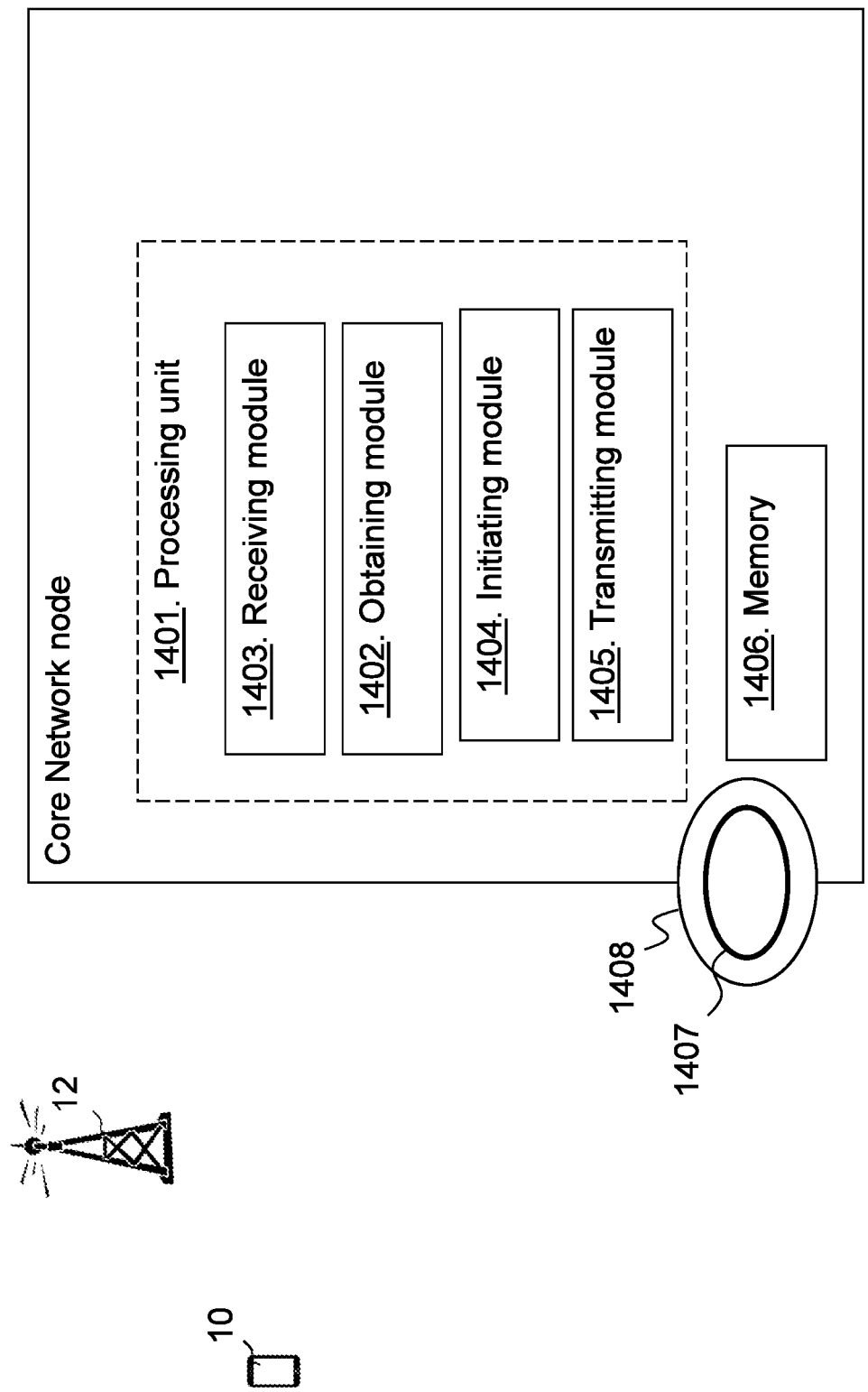
FIG. 14 is a block diagram depicting a core network node according to embodiments herein.

FIG. 14 is a block diagram depicting the core network node also referred to herein as the first core network node 13 for handling communication for the wireless device 10 in the communication network 1. The communication network 1 comprises partitioned sets of functionalities wherein the first set of functionalities belongs to the first network slice supporting the wireless device 10, and the second set of functionalities belongs to a second network slice supporting the wireless device 10, and which first and second sets of functionalities are separated from one another and other sets of functionalities out of a total set of functionalities in the communication network 1.

The core network node may comprise a processing unit 1401, comprising one or more processors, configured to perform the methods herein.

The core network node may comprise an obtaining module 1402. The core network node, the processing unit 1401, and/or the obtaining module 1402 may be configured to obtain the common identity for defining paging occasion for the wireless device 10 for paging from the first network slice and the second network slice. The core network node, the processing unit 1401, and/or the obtaining module 1402 may be configured to obtain the common identity by being configured to retrieve the common identity when attaching the wireless device 10 to the core network node. The core network node, the processing unit 1401, and/or the obtaining module 1402 may be configured to obtain the common identity by being configured to generate the common identity at the core network node. The core network node, the processing unit 1401, and/or the obtaining module 1402 may be configured to generate a random number, which random number is used as the common identity. The core network node, the processing unit 1401, and/or the obtaining module 1402 may be configured to generate the common identity based on an International Mobile Subscriber Identity, IMSI, of the wireless device 10, or an International Mobile Equipment Identity, IMEI, of the wireless device 10.

The core network node may comprise a receiving module 1403. The core network node, the processing unit 1401, and/or the receiving module 1403 may be configured to receive the paging request for the wireless device 10 from the first network slice when the wireless device is in idle mode. The core network node, the processing unit 1401, and/or the receiving module 1403 may be configured to receive the indication to generate the common identity from the wireless device 10.

The core network node may comprise an initiating module 1404. The core network node, the processing unit 1401, and/or the initiating module 1403 may be configured to initiate a paging procedure of the wireless device 10 by using the obtained common identity to define when to page the wireless device 10. The core network node, the processing unit 1401, and/or the initiating module 1403 may be configured to initiate the paging procedure by being configured to calculate the index value for the wireless device 10 based on the obtained common identity; and configured to send the index value, in a paging indication with a paging identity of the wireless device 10, to the radio network node 12, which serves one or more cells in a current registration area for the wireless device 10, which index value is used to define when to page the wireless device 10. The index value may indicates a time offset when to page the wireless device 10. The core network node, the processing unit 1401, and/or the initiating module 1403 may be configured to initiate the paging procedure by being configured to, when one or more condition is fulfilled, transmit a paging indication with IMSI as identifier and by using IMSI as base for the index value in the paging indication.

The core network node may comprise a transmitting module 1405. The core network node, the processing unit 1401, and/or the transmitting module 1405 may be configured to transmit the generated common identity to the wireless device during an attachment to the first network slice from the wireless device. The core network node, the processing unit 1401, and/or the transmitting module 1405 may be configured to transmit the generated common identity to the wireless device 10 after a Non Access Stratum, NAS, security setup to the wireless device 10 is completed.

The core network node further comprises a memory 1406. The memory comprises one or more units to be used to store data on, such as sets of functionalities, indications, common IDs, context, identities, signaling measurements, applications to perform the methods disclosed herein when being executed, and/or similar.

The methods according to the embodiments described herein for the core network node are respectively implemented by means of e.g. a computer program 1407 or a computer program product, comprising instructions, i.e., software code portions, which, when executed on at least one processor, cause the at least one processor to carry out the actions described herein, as performed by the core network node. The computer program 1407 may be stored on a computer-readable storage medium 1408, e.g. a disc or similar. The computer-readable storage medium 1408, having stored thereon the computer program, may comprise the instructions which, when executed on at least one processor, cause the at least one processor to carry out the actions described herein, as performed by the core network node. In some embodiments, the computer-readable storage medium may be a non-transitory computer-readable storage medium.

Figure 15:
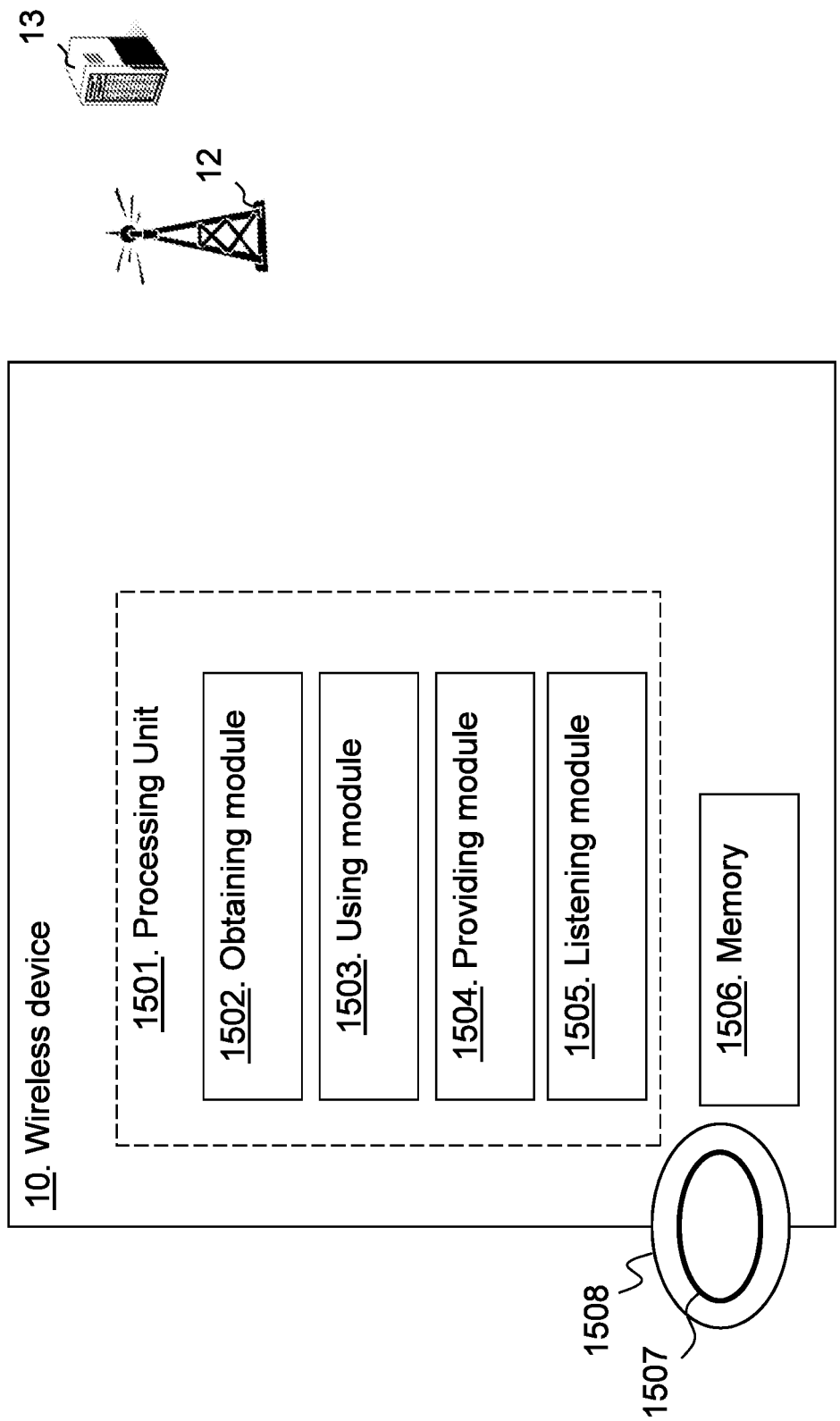
FIG. 15 is a block diagram depicting a wireless device according to embodiments herein.

FIG. 15 is a block diagram depicting the wireless device 10 for handling communication for the wireless device in the communication network 1. The communication network 1 comprises partitioned sets of functionalities wherein the first set of functionalities belongs to the first network slice supporting the wireless device 10, and the second set of functionalities belongs to a second network slice supporting the wireless device 10, and which first and second sets of functionalities are separated from one another and other sets of functionalities out of a total set of functionalities in the communication network 1.

The wireless device 10 may comprise a processing unit 1501, comprising one or more processors, configured to perform the methods herein.

The wireless device 10 may comprise an obtaining module 1502. The wireless device 10, the processing unit 1501, and/or the obtaining module 1502 may be configured to obtain a common identity for defining paging occasion for the wireless device 10 for paging from the first network slice and the second network slice. The wireless device 10, the processing unit 1501, and/or the obtaining module 1502 may be configured to obtain the common identity by being configured to generate the common identity and further being configured to provide the generated common identity to a core network node 13 serving the first network slice and/or the radio network node serving the wireless device 10 during attachment to the core network node 13. The wireless device 10, the processing unit 1501, and/or the obtaining module 1502 may be configured to obtain the common identity by being configured to generate a random number, which random number is the common identity. The wireless device 10, the processing unit 1501, and/or the obtaining module 1502 may be configured to generate the common identity based on an International Mobile Subscriber Identity, IMSI, of the wireless device 10, or an International Mobile Equipment Identity, IMEI, of the wireless device 10. The wireless device 10, the processing unit 1501, and/or the obtaining module 1502 may be configured to obtain by being configured to retrieve the common identity when attaching the wireless device 10 to the core network node.

The wireless device 10 may comprise a using module 1503. The wireless device 10, the processing unit 1501, and/or the using module 1503 may be configured to use the obtained common identity for determining when to listen for a paging message from the first network slice.

The wireless device 10 may comprise a providing module 1504. The wireless device 10, the processing unit 1501, and/or the providing module 1504 may be configured to provide the common identity by being configured to transmit the generated common identity to the core network node during the attachment, either as a parameter in a NAS message or in a dedicated NAS message. The wireless device 10, the processing unit 1501, and/or the providing module 1504 may be configured to provide the common identity by being configured to transmit the generated common identity to the core network node after a Non Access Stratum, NAS, security setup to the core network node 13 is completed. The wireless device 10, the processing unit 1501, and/or the providing module 1504 may be configured to provide the common identity by being configured to transmit the generated common identity to the radio network node 12 after a Radio Resource Control, RRC, security setup to the radio network node 12 is completed.

The wireless device 10 may comprise a listening module 1505. The wireless device 10, the processing unit 1501, and/or the listening module 1505 may be configured to listen for a paging message on a default position of a paging occasion.

The wireless device 10 further comprises a memory 1506. The memory comprises one or more units to be used to store data on, such as sets of functionalities, indications, common IDs, context, identities, signaling measurements, applications to perform the methods disclosed herein when being executed, and/or similar.

The methods according to the embodiments described herein for the wireless device 10 are respectively implemented by means of e.g. a computer program 1507 or a computer program product, comprising instructions, i.e., software code portions, which, when executed on at least one processor, cause the at least one processor to carry out the actions described herein, as performed by the wireless device 10. The computer program 1507 may be stored on a computer-readable storage medium 1508, e.g. a disc or similar. The computer-readable storage medium 1508, having stored thereon the computer program, may comprise the instructions which, when executed on at least one processor, cause the at least one processor to carry out the actions described herein, as performed by the wireless device 10. In some embodiments, the computer-readable storage medium may be a non-transitory computer-readable storage medium.

Figure 16:
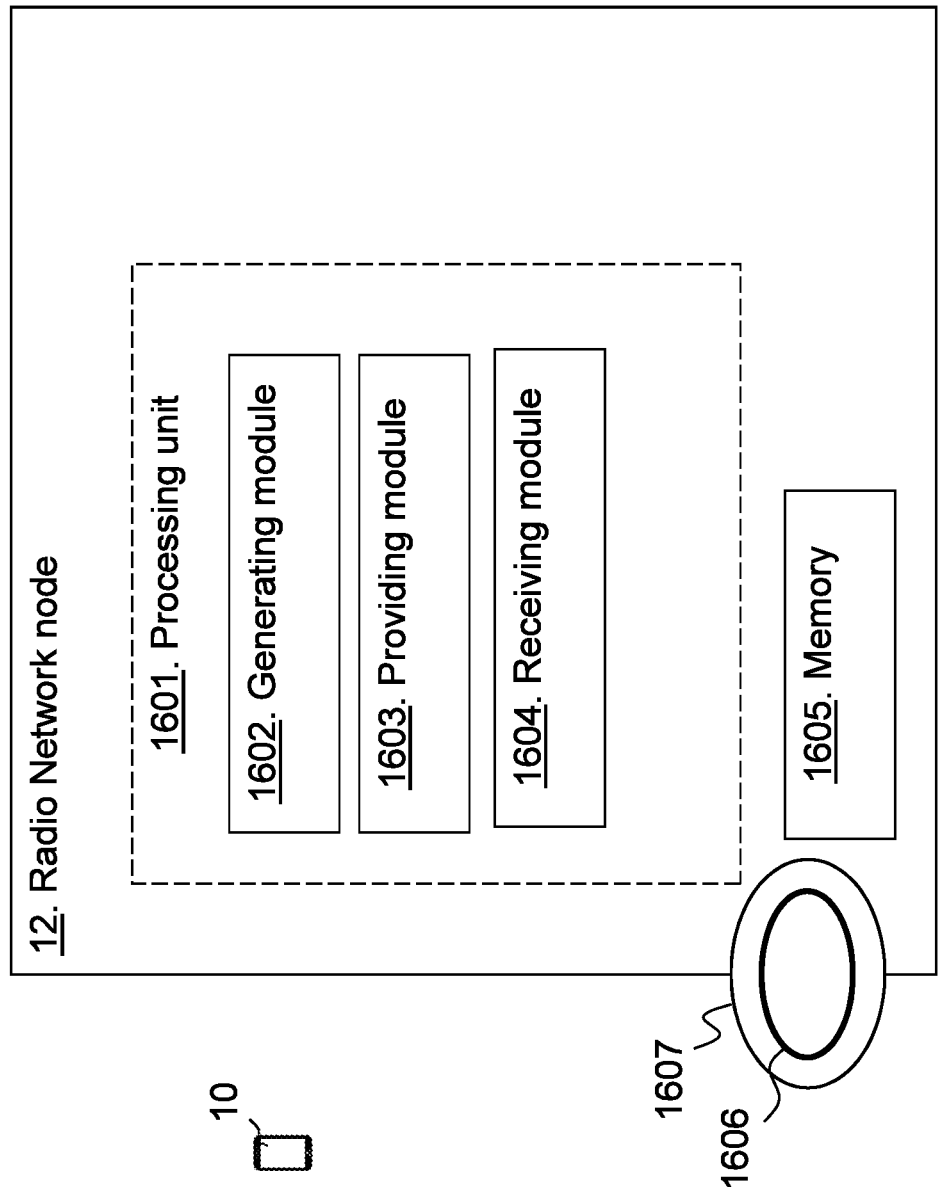
FIG. 16 is a block diagram depicting a radio network node according to embodiments herein.

FIG. 16 is a block diagram depicting the radio network node 12 for handling communication for the wireless device 10 in the communication network 1. The communication network 1 comprises partitioned sets of functionalities wherein the first set of functionalities belongs to the first network slice supporting the wireless device 10, and the second set of functionalities belongs to a second network slice supporting the wireless device 10, and which first and second sets of functionalities are separated from one another and other sets of functionalities out of a total set of functionalities in the communication network 1.

The radio network node 12 may comprise a processing unit 1601, comprising one or more processors, configured to perform the methods herein.

The radio network node 12 may comprise a generating module 1602. The radio network node 12, the processing unit 1601, and/or the generating module 1602 may be configured to generate a common identity for defining paging occasion for the wireless device 10 for paging from the first network slice and the second network slice. The radio network node 12, the processing unit 1601, and/or the generating module 1602 may be configured to generate the random number, which random number is the common identity.

The radio network node 12 may comprise a providing module 1603. The radio network node 12, the processing unit 1601, and/or the providing module 1603 may be configured to provide the generated common identity to the wireless device and/or the core network node serving the first network slice during attachment of the wireless device 10 to the core network node. The radio network node 12, the processing unit 1601, and/or the providing module 1603 may be configured to provide the common identity by being configured to transmit the generated common identity to the core network node over S1AP based protocol and/or the wireless device over a Radio Resource Control, RRC, based protocol. The radio network node 12, the processing unit 1601, and/or the providing module 1603 may be configured to provide the common identity by being configured to transmit the generated common identity to the wireless device after a Radio Resource Control, RRC, security setup to the wireless device 10 is completed.

The radio network node 12 may comprise a receiving module 1604. The radio network node 12, the processing unit 1601, and/or the receiving module 1604 may be configured to receive the indication to generate the common identity from the wireless device 10. The radio network node 12, the processing unit 1601, and/or the receiving module 1604 may be configured to receive a paging indication for paging the wireless device 10 with IMSI as base for an index value in the paging indication, and to transmit a paging message on a default position of a paging occasion for the wireless device 10.

The radio network node 12 further comprises a memory 1605. The memory comprises one or more units to be used to store data on, such as sets of functionalities, indications, common IDs, context, identities, signaling measurements, applications to perform the methods disclosed herein when being executed, and/or similar.

The methods according to the embodiments described herein for the radio network node are respectively implemented by means of e.g. a computer program 1606 or a computer program product, comprising instructions, i.e., software code portions, which, when executed on at least one processor, cause the at least one processor to carry out the actions described herein, as performed by the radio network node. The computer program 1606 may be stored on a computer-readable storage medium 1607, e.g. a disc or similar. The computer-readable storage medium 1607, having stored thereon the computer program, may comprise the instructions which, when executed on at least one processor, cause the at least one processor to carry out the actions described herein, as performed by the radio network node. In some embodiments, the computer-readable storage medium may be a non-transitory computer-readable storage medium.

Embodiments herein relate to a network with network slices i.e. core network with partitioned sets of functionalities where the first core network node 13 supports the first set of functionalities and the second core network node 14 supports the second set of functionalities out of the total set of functionalities in the core networks of the communication network. The first set of functionalities belongs to the first network slice of the core network and the second set belongs to the second network slice, and are separated from another set of functionalities out of the total set of functionalities in the core networks.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a radio network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of radio network nodes will appreciate the cost, performance, and maintenance trade-offs inherent in these design choices.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a core network node for handling communication for a wireless device in a communication network, wherein the communication network comprises partitioned sets of functionalities wherein a first set of functionalities belongs to a first network slice supporting the wireless device, and a second set of functionalities belongs to a second network slice supporting the wireless device, and wherein the first and second sets of functionalities are separated from one another and other sets of functionalities out of a total set of functionalities in the communication network, the method comprising:
obtaining a common identity for defining paging occasion for the wireless device for paging from the first network slice and the second network slice, wherein the obtaining the common identity comprises generating the common identity at the core network node, and wherein the generated common identity is transmitted to the wireless device after a Non Access Stratum (NAS) security setup to the wireless device is completed;
receiving a paging request for the wireless device from the first network slice when the wireless device is in idle mode; and
initiating a paging procedure of the wireless device by using the obtained common identity to define when to page the wireless device.

2. The method according to claim 1, wherein the initiating comprises calculating an index value for the wireless device based on the obtained common identity, wherein the index value is sent, in a paging indication with a paging identity of the wireless device, to a radio network node serving one or more cells in a current registration area for the wireless device, and wherein the index value is used to define when to page the wireless device.

3. The method according to claim 2, wherein the index value indicates a time offset when to page the wireless device.

4. The method according to claim 2, wherein the initiating comprises, when one or more conditions are fulfilled, transmitting the paging indication with an International Mobile Subscriber Identity (IMSI) as identifier, and wherein the IMSI is used as base for the index value in the paging indication.

5. The method according to claim 1, further comprising:
receiving an indication to generate the common identity from the wireless device.

6. The method according to claim 1, wherein the generating the common identity comprises generating a random number, and wherein the random number is used as the common identity.

7. The method according to claim 1, wherein the common identity is generated based on an International Mobile Subscriber Identity (IMSI) of the wireless device, or an International Mobile Equipment Identity (IMEI) of the wireless device.

8. The method according to claim 1, wherein the generated common identity is transmitted to the wireless device during an attachment to the first network slice from the wireless device.

9. A method performed by a wireless device for handling communication for the wireless device in a communication network, wherein the communication network comprises partitioned sets of functionalities wherein a first set of functionalities belongs to a first network slice supporting the wireless device, and a second set of functionalities belongs to a second network slice supporting the wireless device, and wherein the first and second sets of functionalities are separated from one another and other sets of functionalities out of a total set of functionalities in the communication network, the method comprising:
obtaining a common identity for defining paging occasion for the wireless device for paging from the first network slice and the second network slice, wherein the obtaining the common identity comprises generating the common identity, and wherein the generated common identity is transmitted to a core network node after a Non Access Stratum (NAS) security setup to the core network node is completed; and
using the obtained common identity for determining when to listen for a paging message from the first network slice.

10. The method according to claim 9, wherein the generated common identity is transmitted to the core network node serving the first network slice during attachment to the core network node.

11. The method according to claim 9, wherein the obtaining the common identity comprises generating a random number, and wherein the random number is used as the common identity.

12. The method according to claim 9, wherein the common identity is generated based on an International Mobile Subscriber Identity (IMSI) of the wireless device, or an International Mobile Equipment Identity (IMEI) of the wireless device.

13. The method according to claim 9, wherein the generated common identity is transmitted to the core network node during the attachment, either as a parameter in a NAS message or in a dedicated NAS message.

14. The method according to claim 9, further comprising:
listening for a paging message on a default position of a paging occasion.

15. A method performed by a radio network node for handling communication for a wireless device in a communication network, wherein the communication network comprises partitioned sets of functionalities wherein a first set of functionalities belongs to a first network slice supporting the wireless device, and a second set of functionalities belongs to a second network slice supporting the wireless device, and wherein the first and second sets of functionalities are separated from one another and other sets of functionalities out of a total set of functionalities in the communication network, the method comprising:
generating a common identity for defining paging occasion for the wireless device for paging from the first network slice and the second network slice; and
providing the generated common identity to at least one of the wireless device and a core network node serving the first network slice, during attachment of the wireless device to the core network node, wherein the providing the generated common identity comprises transmitting the generated common identity to the wireless device after a Radio Resource Control (RRC) security setup to the wireless device is completed.

16. The method according to claim 15, further comprising:
receiving an indication to generate the common identity from the wireless device.

17. The method according to claim 15, wherein the generating the common identity comprises generating a random number, and wherein the random number is used as the common identity.

18. The method according to claim 15, wherein the providing the generated common identity comprises transmitting the generated common identity to the core network node over S1 Application Protocol (S1AP) based protocol and the wireless device over a RRC based protocol.

19. The method according to claim 15, further comprises receiving a paging indication for paging the wireless device with an International Mobile Subscriber Identity (IMSI) as identifier and with an index value with the IMSI as base, and transmitting a paging message on a default position of a paging occasion for the wireless device.

20. A core network node for handling communication for a wireless device in a communication network, wherein the communication network comprises partitioned sets of functionalities wherein a first set of functionalities belongs to a first network slice supporting the wireless device, and a second set of functionalities belongs to a second network slice supporting the wireless device, and wherein the first and second sets of functionalities are separated from one another and other sets of functionalities out of a total set of functionalities in the communication network, the core network node comprising:
a processor; and
a memory containing instructions which, when executed by the processor cause the core network node to perform operations to:
obtain a common identity for defining paging occasion for the wireless device for paging from the first network slice and the second network slice, wherein to obtain the common identity, the instructions cause the core network node to generate the common identity, and wherein the generated common identity is transmitted to the wireless device after a Non Access Stratum (NAS) security setup to the wireless device is completed;
receive a paging request for the wireless device from the first network slice when the wireless device is in idle mode; and
initiate a paging procedure of the wireless device by using the obtained common identity to define when to page the wireless device.

21. The core network node according to claim 20, wherein the instructions cause the core network node to perform operations to:
initiate the paging procedure by performing operations to calculate an index value for the wireless device based on the obtained common identity; and
send the index value, in a paging indication with a paging identity of the wireless device, to a radio network node serving one or more cells in a current registration area for the wireless device, wherein the index value is used to define when to page the wireless device.

22. The core network node according to claim 21, wherein the index value indicates a time offset when to page the wireless device.

23. The core network node according to claim 21, wherein the instructions cause the core network node to perform operations to initiate the paging procedure by performing operations to, when one or more conditions are fulfilled, transmit the paging indication with an International Mobile Subscriber Identity (IMSI) as identifier, and wherein the IMSI is used as base for the index value in the paging indication.

24. The core network node according to claim 20, wherein the instructions further cause the core network node to perform operations to receive an indication to generate the common identity from the wireless device.

25. The core network node according to claim 20, wherein the instructions further cause the core network node to perform operations to generate a random number, and wherein the random number is used as the common identity.

26. The core network node according to claim 20, wherein the instructions further cause the core network node to perform operations to generate the common identity based on an International Mobile Subscriber Identity (IMSI) of the wireless device, or an International Mobile Equipment Identity (IMEI) of the wireless device.

27. The core network node according to claim 20, wherein the generated common identity is transmitted to the wireless device during an attachment to the first network slice from the wireless device.

28. A wireless device for handling communication for the wireless device in a communication network, wherein the communication network comprises partitioned sets of functionalities wherein a first set of functionalities belongs to a first network slice supporting the wireless device, and a second set of functionalities belongs to a second network slice supporting the wireless device, and wherein the first and second sets of functionalities are separated from one another and other sets of functionalities out of a total set of functionalities in the communication network, the wireless device comprising:
a processor; and
a memory containing instructions which, when executed by the processor, cause the wireless device to perform operations to:
obtain a common identity for defining paging occasion for the wireless device for paging from the first network slice and the second network slice, wherein to obtain the common identity, the instructions cause the wireless device to generate the common identity, and wherein the generated common identity is transmitted to a core network node after a Non Access Stratum (NAS) security setup to the core network node is completed; and use the obtained common identity for determining when to listen for a paging message from the first network slice.

29. The wireless device according to claim 28, wherein the generated common identity is transmitted to the core network node serving the first network slice during attachment to the core network node.

30. The wireless device according to claim 28, wherein the instructions cause the wireless device to perform operations to obtain the common identity by performing operations to generate a random number, and wherein the random number is the common identity.

31. The wireless device according to claim 28, wherein the instructions cause the wireless device to perform operations to generate the common identity based on an International Mobile Subscriber Identity (IMSI) of the wireless device, or an International Mobile Equipment Identity IMEI of the wireless device.

32. The wireless device according to claim 28, wherein the generated common identity is transmitted to the core network node during the attachment, either as a parameter in a NAS message or in a dedicated NAS message.

33. The wireless device according to claim 28, wherein the instructions further cause the wireless device to perform operations to listen for a paging message on a default position of a paging occasion.

34. A radio network node for handling communication for a wireless device in a communication network, wherein the communication network comprises partitioned sets of functionalities wherein a first set of functionalities belongs to a first network slice supporting the wireless device, and a second set of functionalities belongs to a second network slice supporting the wireless device, and wherein the first and second sets of functionalities are separated from one another and other sets of functionalities out of a total set of functionalities in the communication network, the radio network node comprising:

a processor; and a memory containing instructions which, when executed by the processor, cause the radio network node to perform operations to:

generate a common identity for defining paging occasion for the wireless device for paging from the first network slice and the second network slice; and provide the generated common identity to at least one of the wireless device and a core network node serving the first network slice, during attachment of the wireless device to the core network node, wherein the generated common identity is transmitted to the wireless device after a Radio Resource Control (RRC) security setup to the wireless device is completed.

35. The radio network node according to claim 34, wherein the instructions further cause the radio network node to perform operations to receive an indication to generate the common identity from the wireless device.

36. The radio network node according to claim 34, wherein the instructions cause the radio network node to perform operations to generate a random number, and wherein the random number is the common identity.

37. The radio network node according to claim 34, wherein the instructions cause the radio network node to perform operations to provide the generated common identity by performing operations to transmit the generated common identity to the core network node over S1 Application Protocol (S1AP) based protocol and the wireless device over a RRC based protocol.

38. The radio network node according to claim 34, wherein the instructions further cause the radio network node to perform operations to receive a paging indication for paging the wireless device with an International Mobile Subscriber Identity (IMSI) and with an index value with the IMSI as base, and to transmit a paging message on a default position of a paging occasion for the wireless device.

* * * * *